United States Patent
Barroux et al.

(10) Patent No.: US 11,223,829 B2
(45) Date of Patent: Jan. 11, 2022

(54) VIDEO ENCODING APPARATUS AND VIDEO ENCODING METHOD WITH BLOCK SHAPE BASED FILTERING

(71) Applicant: FUJITSU LIMITED, Kawasaki (JP)

(72) Inventors: Guillaume Denis Christian Barroux, Kawasaki (JP); Kimihiko Kazui, Kawasaki (JP); Kenshiro Takeuchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 421 days.

(21) Appl. No.: 16/055,551

(22) Filed: Aug. 6, 2018

(65) Prior Publication Data
US 2019/0052882 A1  Feb. 14, 2019

(30) Foreign Application Priority Data
Aug. 10, 2017 (JP) .............................. JP2017-155418

(51) Int. Cl.
| H04N 19/13 | (2014.01) |
| H04N 19/176 | (2014.01) |
| H04N 19/117 | (2014.01) |
| H04N 19/107 | (2014.01) |
| H04N 19/82 | (2014.01) |

(Continued)

(52) U.S. Cl.
CPC ........... *H04N 19/13* (2014.11); *H04N 19/107* (2014.11); *H04N 19/117* (2014.11); *H04N 19/157* (2014.11); *H04N 19/176* (2014.11); *H04N 19/1887* (2014.11); *H04N 19/463* (2014.11); *H04N 19/70* (2014.11); *H04N 19/82* (2014.11)

(58) Field of Classification Search
None
See application file for complete search history.

(56) References Cited

U.S. PATENT DOCUMENTS

2012/0082224 A1* 4/2012 Van Der Auwera ... H04N 19/85
375/240.12
2013/0136371 A1* 5/2013 Ikai ...................... H04N 19/117
382/224

(Continued)

FOREIGN PATENT DOCUMENTS

| EP | 2 874 391 A1 | 5/2015 |
| WO | 2013/055923 A1 | 4/2013 |

(Continued)

OTHER PUBLICATIONS

Extended European Search Report for European Application No. 18187229.2 dated Jan. 23, 2019.

(Continued)

*Primary Examiner* — Stuart D Bennett
(74) *Attorney, Agent, or Firm* — Staas & Halsey, LLP

(57) ABSTRACT

A first encoder divides an encoding target image included in a video into a plurality of blocks, and encodes each of the plurality of blocks by performing a prediction coding by use of filtering processing. A second encoder encodes a parameter that represents a direction of a line of pixels in the filtering processing. Here, when an encoding target block that is one of the plurality of blocks has a rectangular shape, the second encoder changes, according to a direction of a long side of the rectangular shape, a process of encoding the parameter.

14 Claims, 20 Drawing Sheets

| sao_eo_class_luma/ sao_eo_class_chroma | EDGE OFFSET DIRECTION |
|---|---|
| 0 | HORIZONTAL |
| 1 | VERTICAL |
| 2 | 135 DEGREES |
| 3 | 45 DEGREES |

(51) Int. Cl.
*H04N 19/70* (2014.01)
*H04N 19/169* (2014.01)
*H04N 19/157* (2014.01)
*H04N 19/463* (2014.01)

(56) References Cited

U.S. PATENT DOCUMENTS

2013/0315297 A1 11/2013 Sasai et al.
2013/0336592 A1 12/2013 Matsunobu et al.

FOREIGN PATENT DOCUMENTS

WO 2013/114992 A1 8/2013
WO 2013/175748 A1 11/2013
WO 2013/183268 A1 12/2013

OTHER PUBLICATIONS

J. Joo et al.; "Fast Sample Adaptive Offset Encoding Algorithm for HEVC based on Intra Prediction Mode", 2013 IEEE Third Int'l Conference on Consumer Electronics, Berlin (ICCE-Berlin), Sep. 2013, pp. 50-53.
Jicheng An et al., "Quadtree plus binary tree structure integration with JEM tools", JVET-B0023, Joint Video Exploration Team of ITU-T SG 16 WP 3 and ISO/IEC JTC 1/sc 29/WG 11, Feb. 2016, pp. 1-10.
"Block partitioning structure for next generation video coding", ITU, Listing generated Jul. 20, 2017 at www.itu.int/md/T13-SG16-C-0966/en.

* cited by examiner

| sao_eo_class_luma/ sao_eo_class_chroma | EDGE OFFSET DIRECTION |
|---|---|
| 0 | HORIZONTAL |
| 1 | VERTICAL |
| 2 | 135 DEGREES |
| 3 | 45 DEGREES |

F I G. 1

| sao_eo_class_luma/<br>sao_eo_class_chroma | BIT STRING |
|---|---|
| 0 | 00 |
| 1 | 01 |
| 2 | 10 |
| 3 | 11 |

FIG. 2

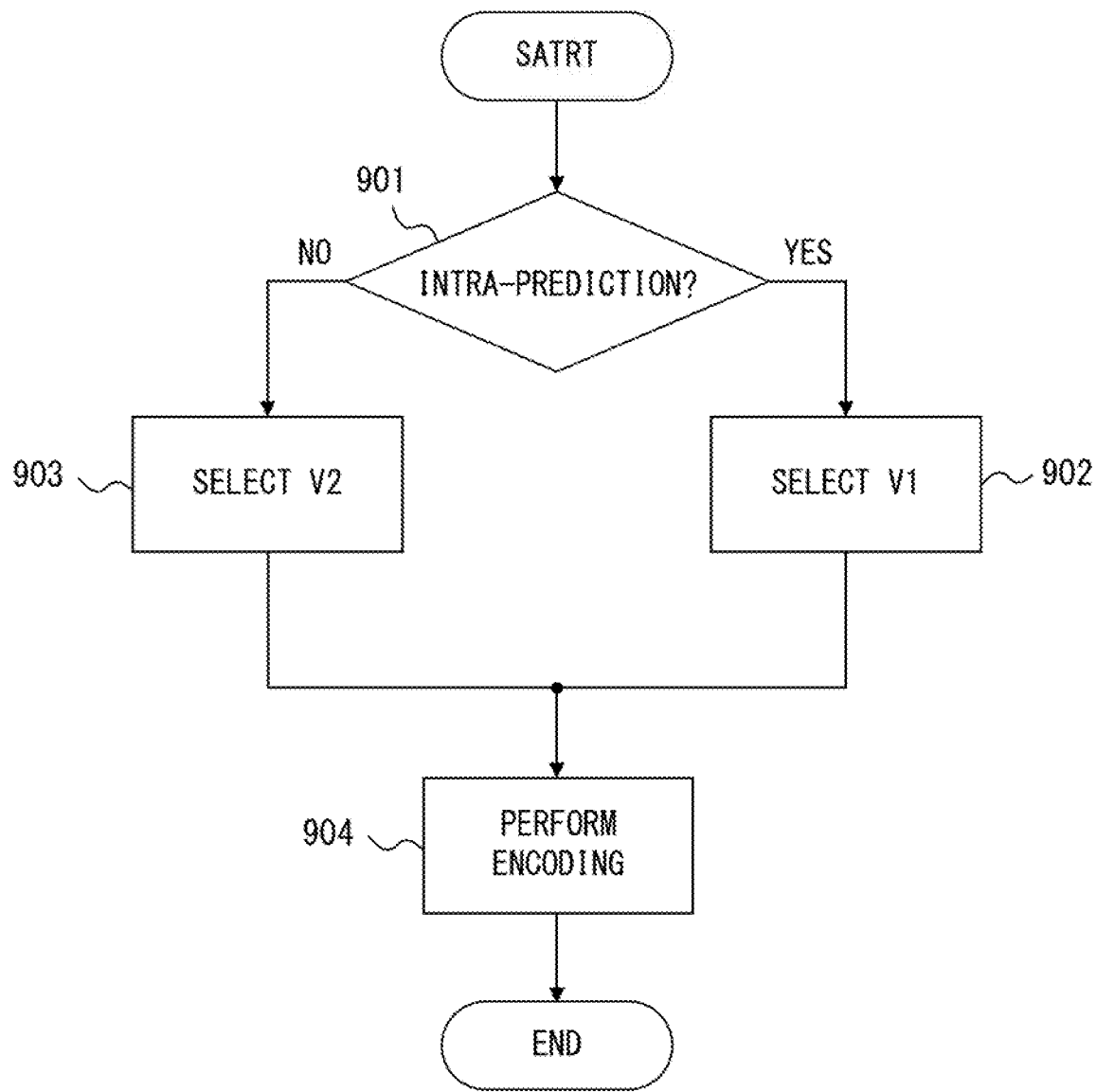
F I G. 9

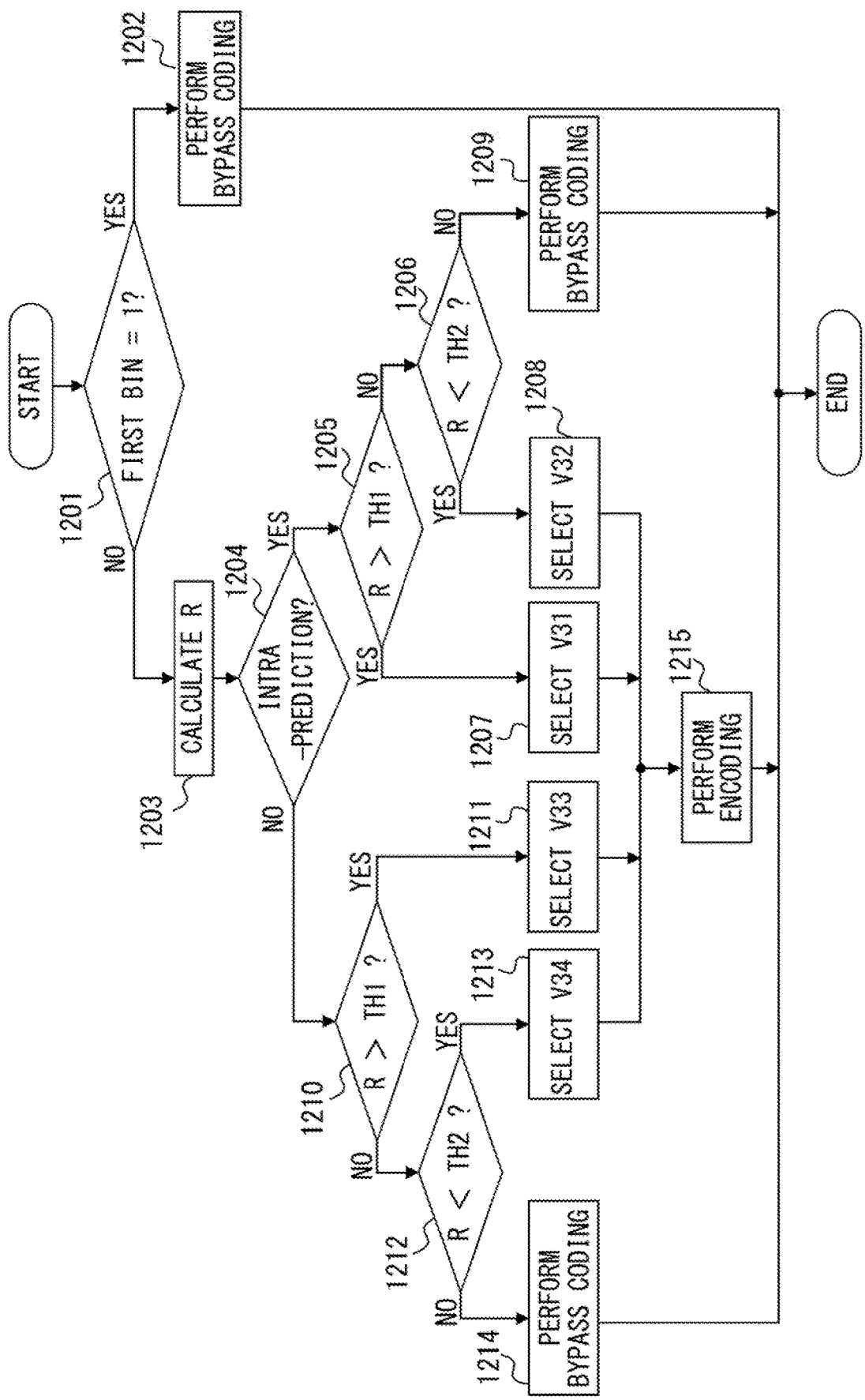
F I G. 12

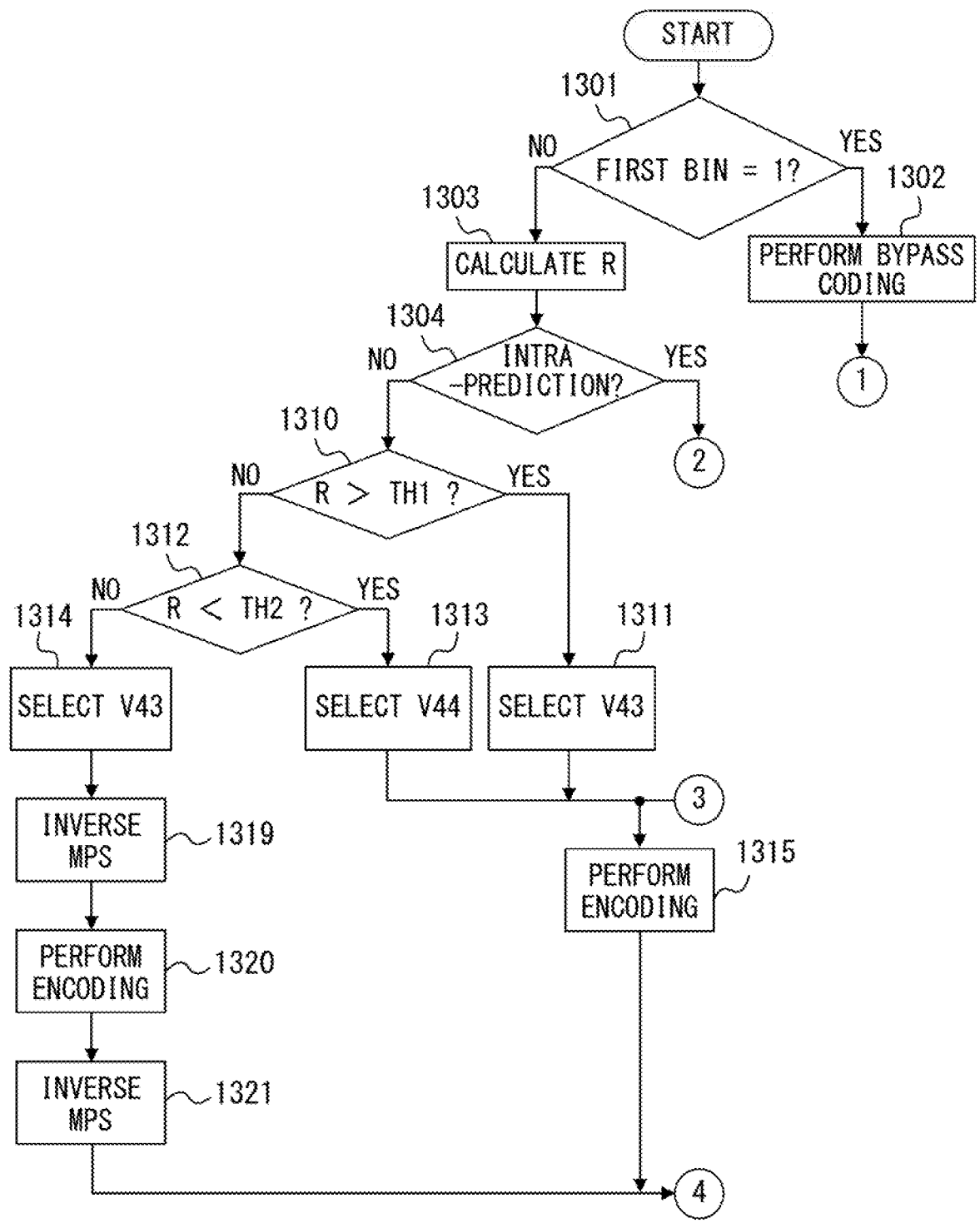
F I G. 13 A

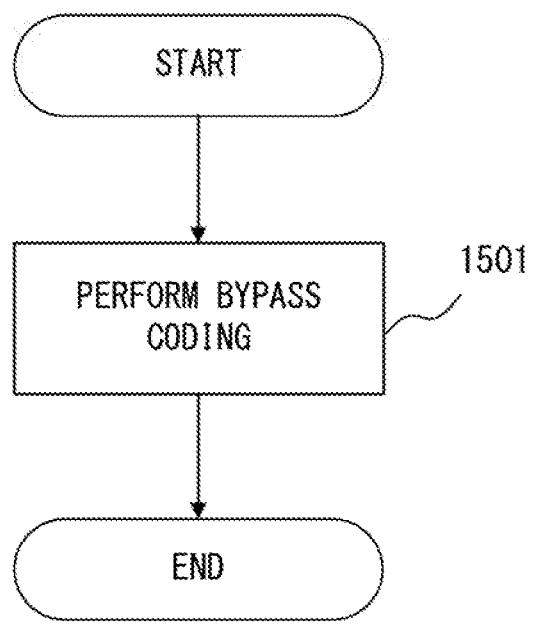
F I G. 1 5

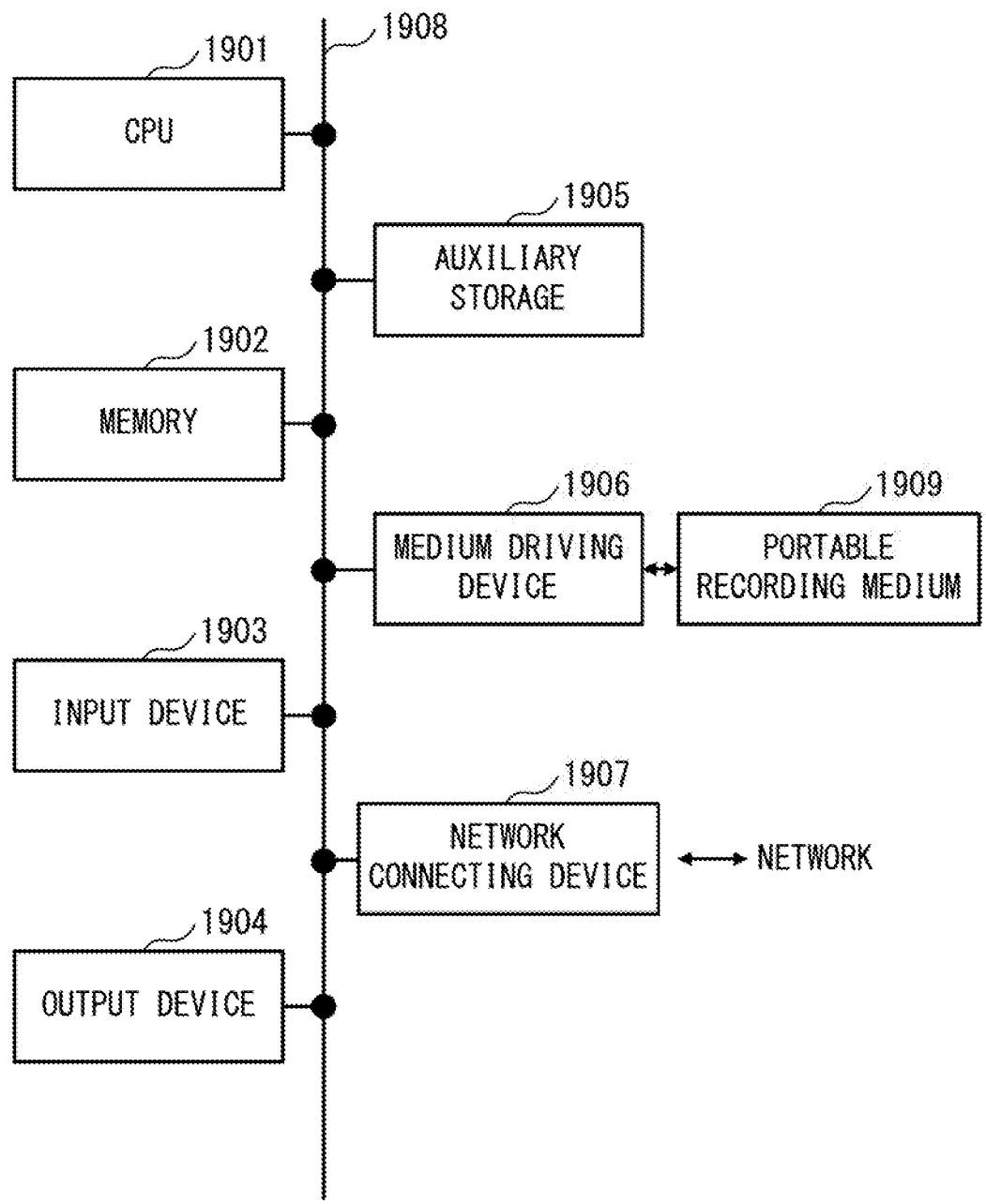
F I G. 19

VIDEO ENCODING APPARATUS AND VIDEO ENCODING METHOD WITH BLOCK SHAPE BASED FILTERING

CROSS-REFERENCE TO RELATED APPLICATION

This application is based upon and claims the benefit of priority of the prior Japanese Patent Application No. 2017-155418, filed on Aug. 10, 2017, the entire contents of which are incorporated herein by reference.

FIELD

The embodiments discussed herein are related to a video encoding apparatus and a video encoding method.

BACKGROUND

As the "High Efficiency Video Coding" (HEVC) standard is about to have its fourth version published, it has reached a stable phase. The International Telecommunication Union Telecommunication Standardization Sector (ITU-T) is known as one of the sectors of the ITU. ISO/IEC JTC 1 is the joint technical committee 1 of the International Organization for Standardization (ISO) and the International Electrotechnical Commission (IEC).

Recently, the ITU-T WP3/16 and the ISO/IEC JCT 1/SC 29/WG 11 have established a new group called the Joint Video Exploration Team (JVET). The JVET is responsible for leading exploratory work to evaluate possible enhancements of video compression schemes. The contributions made by its members are uploaded onto the "http://phenix.it-sudparis.eu/jvet/" website.

One of the key aspects of the HEVC standard is that it makes use of the quad-tree structure with recursive partitioning of a square block into four equal smaller blocks. An elementary block that is recursively partitioned is called Coding Tree Unit (CTU).

Consecutive CTUs are grouped in a bigger data element called a slice. A slice may be defined as an intra-prediction slice or an inter-prediction slice depending on which of an intra-prediction and an inter-prediction is allowed.

Recently, block partitioning called the quadtree plus binary tree (QTBT) block partitioning has been proposed to the JVET (see, for example, Non Patent Document 1 and Non Patent Document 2). When the QTBT block partitioning is used, a binary tree block subdivision is continuously performed after a regular quad-tree block division is performed.

When the binary tree block subdivision is performed, each block is horizontally or vertically divided into two sub-blocks, regardless of the shape of the current block. Thus, each resulting sub-block may have a rectangular shape. For example, an 8×16 (pixel) block may be subdivided into either two 4×16 blocks or two 8×8 blocks.

The sample adaptive offset (SAO) process and the context-adaptive arithmetic coding used in video coding are also known (see, for example, Patent Document 1 and Patent Document 2). Further, a technology is also known that uses a rectangle as a shape of a transform block of a color-difference signal (see, for example, Patent Document 3).

Patent Document 1: International Publication Pamphlet No. WO2013/175748
Patent Document 2: International Publication Pamphlet No. WO2013/183268
Patent Document 3: International Publication Pamphlet No. WO2013/114992
Non Patent Document 1: "[966] Block partitioning structure for next generation video coding", [online], ITU, [searched on Jul. 20, 2017], Internet <URL: http://www.i-tu.int/md/T13-SG16-C-0966/en>
Non Patent Document 2: "Quadtree plus binary tree structure integration with JEM tools", JVET-B0023, Joint Video Exploration Team of ITU-T SG 16 WP 3 and ISO/IEC JTC 1/SC 29/WG 11, Feb. 20, 2016.

SUMMARY

According to an aspect of the embodiments, a video encoding apparatus includes a first encoder and a second encoder. The first encoder divides an encoding target image included in a video into a plurality of blocks, and encodes each of the plurality of blocks by performing a prediction coding by use of filtering processing. The second encoder encodes a parameter that represents a direction of a line of pixels in the filtering processing.

When an encoding target block that is one of the plurality of blocks has a rectangular shape, the second encoder changes, according to a direction of a long side of the rectangular shape, a process of encoding the parameter.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates a parameter;
FIG. 2 illustrates a fixed length coding of the parameter;
FIG. 9 is a flowchart that illustrates a first specific example of first-bin encoding processing;
FIG. 12 is a flowchart that illustrates a second specific example of the second-bin encoding processing;
FIG. 13A is part 1 of a flowchart that illustrates a third specific example of the second-bin encoding processing;
FIG. 15 is a flowchart that illustrates a second specific example of the first-bin encoding processing;
FIG. 19 illustrates a configuration of an information processing device.

DESCRIPTION OF EMBODIMENTS

Figure 3:
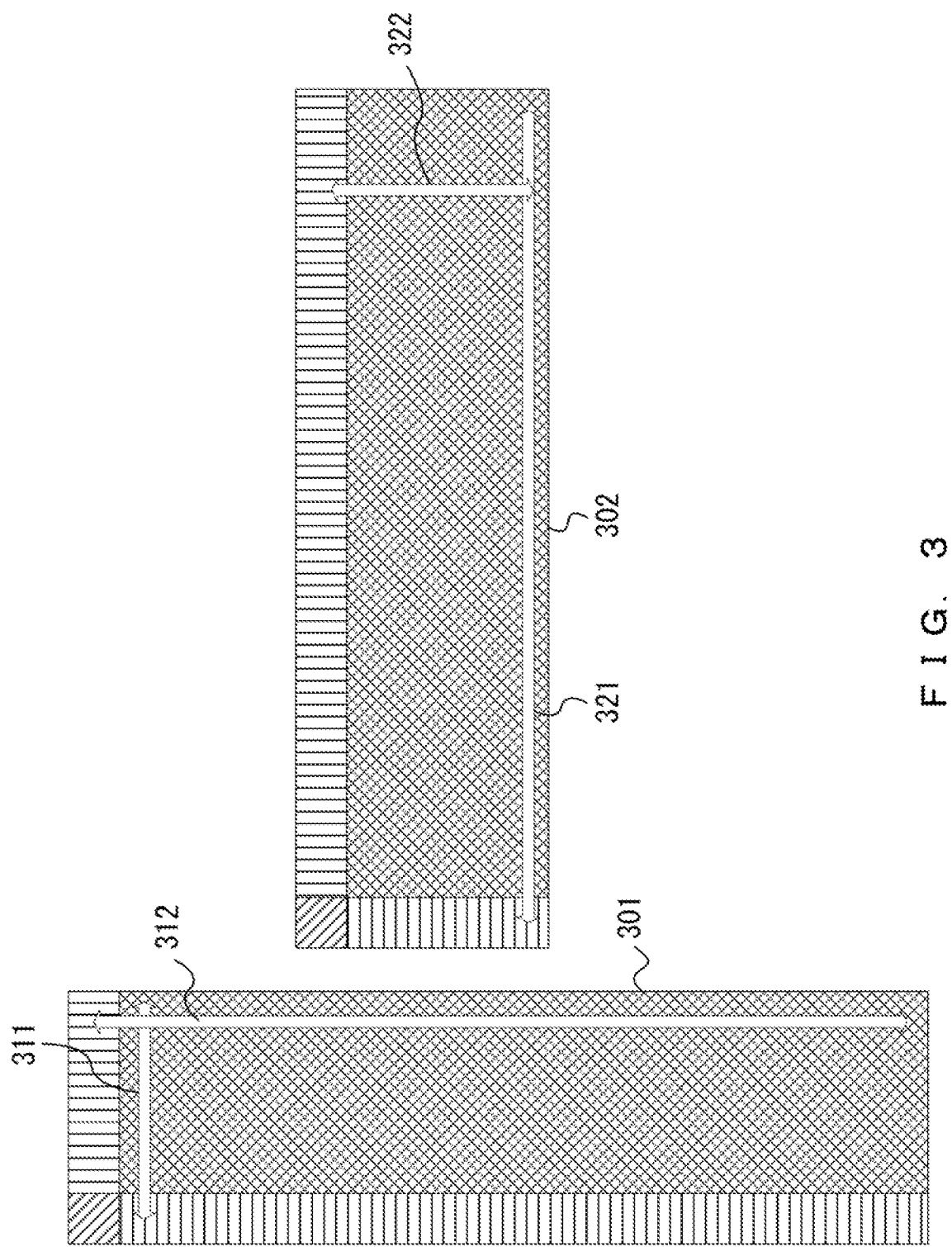
FIG. 3 illustrate rectangular sub-blocks.

Embodiments will now be described in detail with reference to the drawings.

In the QTBT block partitioning described above, restrictions on a minimum width and a minimum height are specified. Further, it is proposed that a frequency transform such as the discrete cosine transform (DCT) should be performed on blocks directly resulting from the partitioning process. This thereby introduces various non-square (rectangular) transforms.

Meanwhile, the SAO filter, a technology supported by the current HEVC standard, is deemed likely to also be supported by possible future video coding standards. The SAO filter aims at attenuating any ringing noise introduced by the quantization of a high frequency component in an encoded block, and has two main operation modes below:

(1) Band Offset Mode

An offset value corresponding to a range to which a pixel value of each pixel belongs is applied to the pixel.

(2) Edge Offset Mode

An offset value is applied to a pixel whose pixel value is lower or higher than pixel values of its two neighbors along a prescribed direction.

In the edge offset mode, edge offset filtering is applied to each pixel by comparing its pixel value with the pixel values of two neighboring pixels aligned along a direction specified in a bit stream. Here, depending on the original pixel value of a filtering target pixel and the pixel values of its surrounding neighbors, a different offset value is added to the original pixel value of the filtering target pixel. This makes it possible to reduce the difference between the pixel value of the target pixel and the average of the pixel values of the two neighboring pixels.

The direction along which neighboring pixels are chosen for each target pixel is determined and signaled once for each CTU. The edge offset filtering direction for a luma component and a chroma component are signaled by the bit stream parameters sao_eo_class_luma and sao_eo_class_chroma, respectively.

FIG. 1 illustrates an example of values of sao_eo_class_luma and sao_eo_class_chroma. The edge offset direction represents an edge offset filtering direction. The parameter "0" represents a horizontal direction, the parameter "1" represents a vertical direction, the parameter "2" represents a 135-degree diagonal direction, and the parameter "3" represents a 45-degree diagonal direction.

Video coding standards encompass two categories of prediction method to compress information on an encoding target block by using information on a previously encoded block: an intra-prediction and an inter-prediction. The intra-prediction uses the pixel values of a block close to the encoding target block distance-wise. The intra-prediction may use the pixel values of a block located around the encoding target block to predict the pixel values of the encoding target block.

The inter-prediction uses the pixel values of a block close to the encoding target block temporally-wise. The inter-prediction may search for a combination of encoded blocks in encoded pictures to predict the pixel values of the encoding target block. In this case, encoded blocks in such a combination are combined to generate an approximation of the encoding target block.

The difference between a pixel value generated by an intra-prediction or an inter-prediction and an original pixel value is called a residual error or a prediction error. The prediction error is then further processed by being transformed from the pixel domain into the frequency domain. A frequency domain element is then quantized and a loss is thereby introduced into the encoding. As a direct result of performing such a prediction coding, a loss that occurs due to quantization increase if a prediction error becomes larger.

Video coding standards also encompass the binarization and the entropy coding of data in order to transmit data over a bit stream. The binarization includes converting a parameter value into a bit string for example. Among the several binarization patterns which are used for HEVC, the fixed length coding is used to convert the value of sao_eo_class_luma and the value of sao_eo_class_chroma into a binary string.

FIG. 2 illustrates an example of a fixed length coding of the parameter of FIG. 1. A bit string is generated by performing fixed length coding, and is constituted of two bit values of a first bin and a second bin. Each bin represents a bit position, wherein the first bin corresponds to the side of a most significant bit and the second bin corresponds to the side of a least significant bit.

The parameter "0" is converted into a bit string "00", the parameter "1" is converted into a bit string "01", the parameter "2" is converted into a bit string "10", and the parameter "3" is converted into a bit string "11".

The entropy coding of HEVC is performed by using Context-Adaptive Binary Arithmetic Coding (CABAC). The usage of the CABAC allows the allocation of less bits to encode a value which is more probable and the allocation of more bits to encode a value which is less probable.

In the CABAC, a bit string is encoded using the probability that a bit value (symbol) of a logic "1" or a logic "0" will occur in each bit position of the bit string. A bit value in each bit position is encoded using a variable probability or a fixed probability.

When the variable probability is used, information that specifies a most probable symbol (MPS), a least probable symbol (LPS), a probability of occurrence of a most probable symbol, and a probability of occurrence of a least probable symbol is described using a context variable. The MPS represents a bit value, from among a logic "1" and a logic "0", that is more probable, and the LPS represents a bit value that is less probable. The probability of occurrence of each symbol is updated according to an actual bit value in a corresponding bit position.

When the fixed probability is used, the probability of occurrence of the logic "1" and the probability of occurrence of the logic "0" are both fixed at 50 percent, and the probability of occurrence of each symbol is not updated. The encoding using a fixed probability is referred to as bypass coding.

As discussed above, it is preferable that the following two points be taken into account when the QTBT block partition is used.

(a) A sub-block resulting from partitioning may have a rectangular shape, with the width of the sub-block being unequal in length to the height of the sub-block.

(b) A sub-block on which prediction processing is to be performed is the same as the sub-block on which the frequency transform is to be performed.

FIG. 3 illustrates an example of rectangular sub-blocks. When a rectangular sub-block is encoded using an intra-prediction, the distance between a pixel in the sub-block and a neighboring block used as a reference varies greatly depending on the position of the pixel in the sub-block.

For example, a vertically long block 301 has a height greater in length than its width, and the long side of the vertically long block 301 extends vertically. Thus, a maximum distance 312 in a vertical direction from a pixel in the block 301 to a neighboring block on the upper side of the block 301 is greater than a maximum distance 311 in a horizontal direction from a pixel in the block 301 to a neighboring block on the left side of the block 301.

A horizontally long block 302 has a width greater in length than its height, and the long side of the block 302 extends horizontally. Thus, a maximum distance 321 in a horizontal direction from a pixel in the block 302 to a neighboring block on the left side of the block 302 is greater than a maximum distance 322 in a vertical direction from a pixel in the block 302 to a neighboring block on the upper side of the block 302.

Thus, when a pixel located near the short side of a rectangular block is used as a reference pixel, the distance between an encoding target pixel and its reference pixel will be large.

In a video content, the more distant pixels are, the less correlated their pixel values are. Thus, if a plurality of reference pixels are located farther away from an encoding target pixel, the pixel values of the plurality of reference pixels will be statistically less correlated with the pixel value of the encoding target pixel.

A prediction error generated due to an intra-prediction being performed on a rectangular block will therefore have a greater variability along the axis of the long side of the block than along the short side of the block. When the prediction error is transformed into the frequency domain, an energy repartition is obtained that is more spread across a plurality of different frequency components in a direction of the long side than across a plurality of different frequency components in a direction of the short side. When quantized, such a spread energy in only one direction will generate a larger loss in that direction.

As the SAO filter is used to correct such a loss, it is more likely that an edge offset filtering direction will be identical to a direction in which a largest loss occurs. However, the SAO filter implementations do not currently use such a possibility to reduce the signaling cost.

When a rectangular sub-block is encoded using an inter-prediction, the prediction error has no tendency such as the prediction error presented when an intra-prediction coding is performed. However, the shape of a block and a frequency transform based on the shape impact a pattern of a repartition of coefficients obtained by performing the transform and a pattern of a loss due to quantization.

In video coding, a frequency transform is used to gather data within a limited number of values as much as possible. For example, when using the DCT for a large square prediction-error block, most of the high frequency components are close to 0 and most of the information is kept within the low frequency components.

It can therefore be inferred that when the DCT described above is used for a rectangular prediction-error block, the dimension in which the number of different frequency components is largest will have a higher energy compaction capability with its high frequency components having smaller values. The dimension in which the number of different frequency components is smallest will have a lower energy compaction capability with its high frequency components having larger values.

Thus, when a rectangle-shaped frequency transform is performed on a prediction error having an evenly spread energy, high frequency components representing a shorter dimension will have a greater loss after quantization than the high frequency components representing a longer dimension. Therefore, there is a good possibility that an edge offset filtering direction when an inter-prediction is used will be identical to a direction corresponding to the short side of a rectangular block.

This tendency of losing more information in the frequency components representing a change in a direction of the short side of a rectangular block applies to not only when an inter-prediction is used but also when an intra-prediction is used. However, the variability of a prediction error generated due to an intra-prediction has an effect much greater than the effect of a loss due to a frequency transform.

The existing SAO parameter signaling schemes do not account for the possibility of an edge offset filtering direction used when the QTBT block partitioning is performed. Thus, a parameter that represents an edge offset filtering direction is encoded by performing the bypass coding by use of a fixed probability. In this case, a probabilistic change in edge offset filtering direction based on the shape of a rectangular block is not reflected in a code amount produced by the CABAC, so a code amount for signaling the parameter is not reduced.

This problem occurs not only when video coding using the QTBT block partitioning is performed but also when other video coding using a rectangular block is performed.

Figure 4:
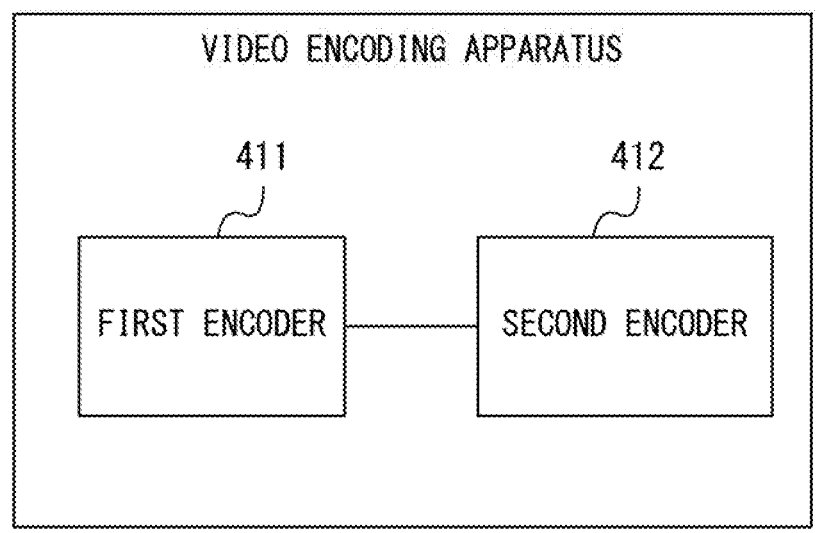
FIG. 4 illustrates a functional configuration of a video encoding apparatus.

FIG. 4 illustrates an example of a functional configuration of a video encoding apparatus according to the embodiments. A video encoding apparatus 401 includes a first encoder 411 and a second encoder 412.

Figure 5:
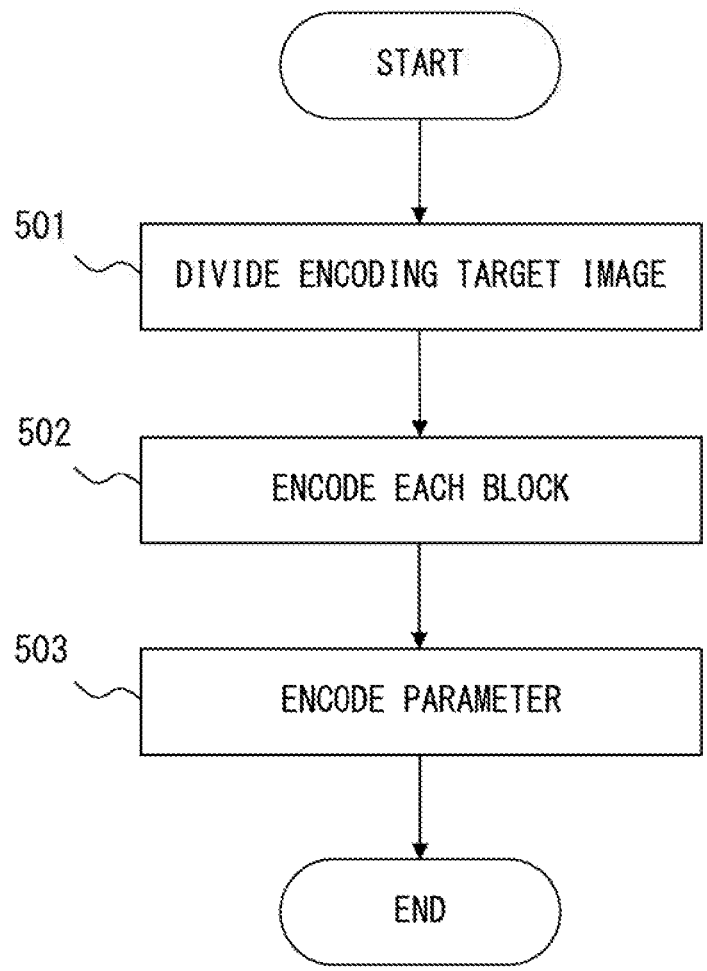
FIG. 5 is a flowchart of video encoding processing.

FIG. 5 is a flowchart that illustrates an example of video encoding processing performed by the video encoding apparatus 401 of FIG. 4. First, the first encoder 411 divides an encoding target image included in a video into a plurality of blocks (Step 501), and encodes each of the plurality of blocks by performing a prediction coding by use of filtering processing (Step 502). Then, the second encoder 412 encodes a parameter that represents a direction of a line of pixels in the filtering processing (Step 503).

In a first specific example of the video encoding processing, when an encoding target block that is one of the plurality of blocks has a rectangular shape, the second encoder 412 changes a process of encoding the parameter.

In a second specific example of the video encoding processing, when an encoding target block that is one of the plurality of blocks has a rectangular shape, the first encoder 411 determines the direction of the line of pixels in the filtering processing according to a direction of the long side of the rectangular shape. When the encoding target block does not have a rectangular shape, the second encoder 412 encodes the parameter.

The video encoding apparatus 401 described above can reduce a code amount that is produced when video encoding using a rectangular block is performed.

Figure 6:
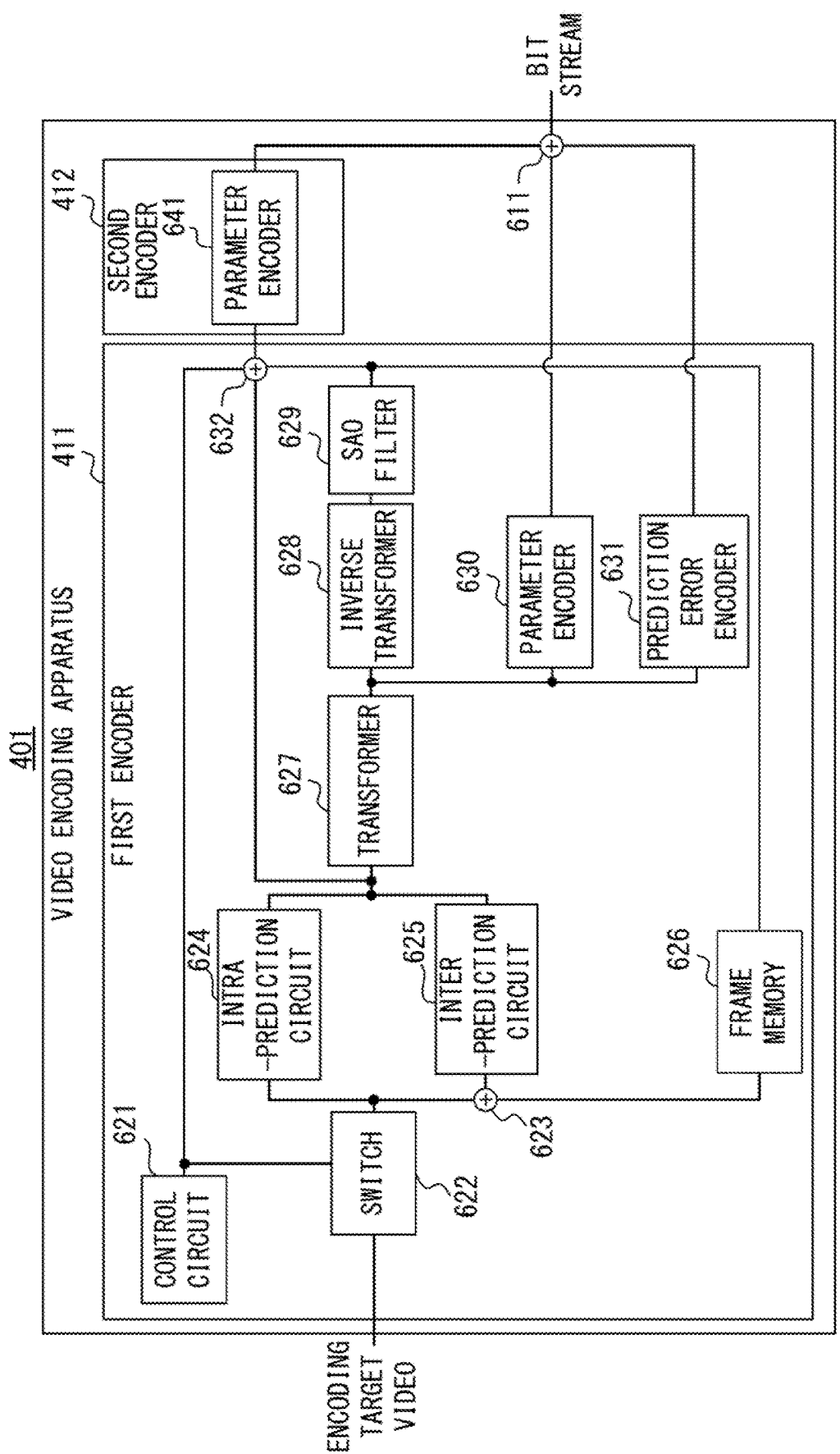
FIG. 6 illustrates a functional configuration that illustrates a specific example of the video encoding apparatus.

FIG. 6 illustrates a specific example of the video encoding apparatus 401 of FIG. 4. The video encoding apparatus 401 of FIG. 6 includes the first encoder 411, the second encoder 412, and a combiner 611.

The first encoder 411 includes a control circuit 621, a switch 622, a combiner 623, an intra-prediction circuit 624, an inter-prediction circuit 625, and a frame memory 626. The first encoder 411 further includes a transformer 627, an inverse transformer 628, a SAO filter 629, a parameter encoder 630, a prediction error encoder 631, and a combiner 632. The second encoder 412 includes a parameter encoder 641.

The video encoding apparatus 401 may be implemented as, for example, a hardware circuit. In this case, each component included in the video encoding apparatus 401 may be implemented as an individual circuit, or the components included in the video encoding apparatus 401 may be implemented as one integrated circuit.

The video encoding apparatus 401 encodes an input encoding target video, and outputs the encoded video as a bit stream. An encoding target video includes a plurality of pictures. Each of the pictures corresponds to an encoding target image, and may be referred to as a frame. Each of the pictures may be a color image or a monochrome image. When the picture is a color image, the pixel value may be in the RGB format or in the YUV format.

In the example of FIG. 6, each picture includes a plurality of slices, and each of the plurality of slices includes a plurality of CTUs. The control circuit 621 determines whether to encode each slice as an intra-prediction slice or an inter-prediction slice, and outputs a determined type of slice to the switch 622 and the combiner 632.

The switch 622 divides an encoding target picture into a plurality of blocks by the QTBT block partitioning. Then, the switch 622 outputs an encoding target block included in an intra-prediction slice to the intra-prediction circuit 624, and outputs an encoding target block included in an inter-prediction slice to the inter-prediction circuit 625.

The intra-prediction circuit 624 performs an intra-prediction on a encoding target block, and outputs a prediction error and a prediction parameter of the intra-prediction to the transformer 627 and outputs information on a block division of a CTU to the combiner 632. The prediction error output by the intra-prediction circuit 624 tends to have a large value.

The frame memory 626 stores a locally decoded image of each block, and outputs the locally decoded image to the combiner 623 as a reference image for the encoding target block. The combiner 623 outputs, to the inter-prediction circuit 625, the encoding target block output by the switch 622 and the reference image output by the frame memory 626.

Using an intra-prediction and an inter-prediction that are performed on the encoding target block, the inter-prediction circuit 625 outputs a prediction error and a prediction parameter of the inter-prediction to the transformer 627, and outputs information on a block division of a CTU to the combiner 632. The prediction error output by the inter-prediction circuit 625 has a value smaller than that of the prediction error output by the intra-prediction circuit 624.

The transformer 627 performs a frequency transform and quantization on a prediction error so as to generate coefficient information, and outputs the coefficient information and a compression parameter to the inverse transformer 628, the parameter encoder 630, and the prediction error encoder 631. Examples of the compression parameter are a prediction parameter and a quantization parameter.

The inverse transformer 628 performs an inverse quantization and an inverse frequency transform on the coefficient information output by the transformer 627 so as to generate a reconstructed pixel value, and outputs the reconstructed pixel value to the SAO filter 629.

The SAO filter 629 selects one of the operation modes that are the band offset mode and the edge offset mode, and applies SAO filtering processing to the reconstructed pixel value so as to generate a filtered reconstructed pixel value.

Then, the SAO filter 629 outputs a locally decoded image constituted of filtered reconstructed pixel values to the frame memory 626, and outputs a SAO filtering parameter to the combiner 632. Examples of the SAO filtering parameter are an operation mode, an offset value, and an edge offset filtering direction.

The frame memory 626 stores the locally decoded image output by the SAO filter 629. The locally decoded image stored by the frame memory 626 is used as a reference image for a subsequent image.

The combiner 632 combines the type of slice that is output by the control circuit 621, the information on a block division of a CTU that is output by the intra-prediction circuit 624 or the inter-prediction circuit 625, and the parameter output by the SAO filter 629, and outputs them to the parameter encoder 641. The parameter encoder 641 encodes the SAO filtering parameter according to the type of slice and the information on a block division, and outputs a bit string of the encoded parameter to the combiner 611.

The parameter encoder 630 encodes the compression parameter output by the transformer 627, and outputs a bit string of the encoded compression parameter to the combiner 611. The prediction error encoder 631 encodes the coefficient information output by the transformer 627, and outputs a bit string of the encoded coefficient information to the combiner 611. The parameter encoder 641, the parameter encoder 630, and the prediction error encoder 631 can encode encoding target information by, for example, the CABAC.

The combiner 611 combines the bit strings output by the parameter encoder 641, the parameter encoder 630, and the prediction error encoder 631, and outputs a bit stream of the encoded video.

The video encoding apparatus 401 can transmit the bit stream to a video decoding apparatus (not illustrated) through a communication network. In this case, the video decoding apparatus decodes the bit stream so as to restore the encoding target video. Further, the video encoding apparatus 401 can save the bit stream in a storage device in order to use the bit stream when image processing is performed later.

The video encoding apparatus 401 is used for various applications. For example, the video encoding apparatus 401 can also be incorporated into a video camera, a video transmitter, a video receiver, a video phone system, a computer, or a cellular phone.

Figure 7:
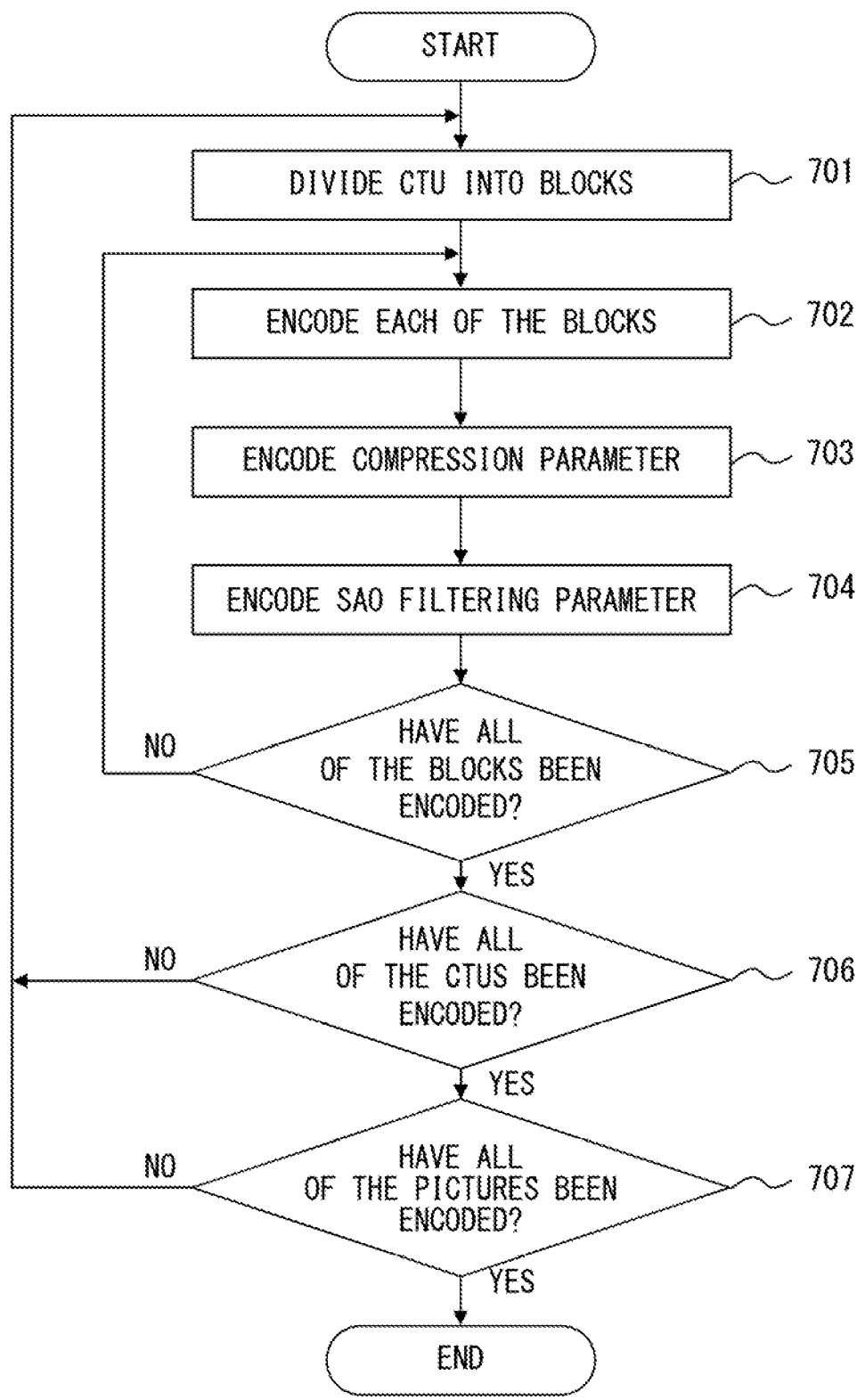
FIG. 7 is a flowchart that illustrates a specific example of the video encoding processing.

FIG. 7 is a flowchart that illustrates a specific example of the video encoding processing performed by the video encoding apparatus 401 of FIG. 6. First, the first encoder 411 divides a CTU included in the encoding target picture included in the encoding target video into a plurality of blocks by the QTBT block partitioning (Step 701). Then, the first encoder 411 performs a prediction coding on a block in the CTU so as to encode a prediction error (Step 702) and to encode a compression parameter (Step 703).

Next, the second encoder 412 encodes a SAO filtering parameter (Step 704). The SAO filtering parameter is encoded after information on a block division of a CTU because it is encoded using the information on a block division of a CTU.

Then, the first encoder 411 checks whether all of the blocks in the CTU have been encoded (Step 705). When an unencoded block remains (Step 705, NO), the video encoding apparatus 401 repeats the processes of and after Step 702 for a next block.

When all of the blocks have been encoded (Step 705, YES), the first encoder 411 checks whether all of the CTUs in the encoding target picture (Step 706). When an unencoded CTU remains (Step 706, NO), the video encoding apparatus 401 repeats the processes of and after Step 701 for a next CTU.

When all of the CTUs have been encoded (Step 706, YES), the first encoder 411 checks whether all of the pictures in the encoding target video have been encoded (Step 707). When an unencoded picture remains (Step 707, NO), the video encoding apparatus 401 repeats the processes of and after Step 701 for a next picture. When all of the pictures have been encoded (Step 707, YES), the video encoding apparatus 401 terminates the processing.

Figure 8:
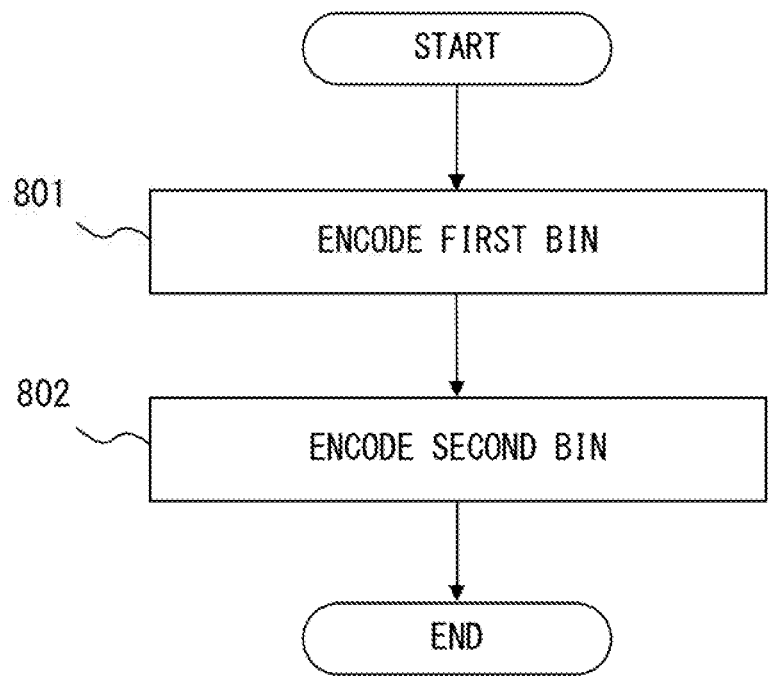
FIG. 8 is a flowchart of parameter encoding processing.

FIG. 8 is a flowchart that illustrates an example of processing of encoding a parameter that represents an edge offset filtering direction. The encoding processing of FIG. 8 is performed in Step 704 of FIG. 7 by the parameter encoder 641 of the second encoder 412.

In this encoding processing, a bit string of the parameter that represents an edge offset filtering direction illustrated in FIG. 2 is encoded using the CABAC. Here, the usage of a variable probability for at least a portion of the bit string of the parameter makes it possible to reflect, in the encoding processing, the difference in the probability of an edge offset filtering direction depending on the shape of the encoding target block.

First, the parameter encoder 641 encodes a bit value of a first bin of the bit string (Step 801). Next, the parameter encoder 641 encodes a bit value of a second bin of the bit string (Step 802).

Next, the first specific example of the video encoding processing is described with reference to FIGS. 9 to 16. In the first specific example of the video encoding processing, a process of encoding a SAO filtering parameter is changed according to information on a block division of a CTU.

FIG. 9 is a flowchart that illustrates a first specific example of first-bin encoding processing in Step 801 of FIG. 8. In the first specific example, the bit value of the first bin is encoded using one of the two context variables.

First, according to the type of slice output by the control circuit 621, the parameter encoder 641 determines whether the CTU that includes the encoding target block belongs to an intra-prediction slice or an inter-prediction slice (Step 901).

When the CTU belongs to the intra-prediction slice (Step 901, YES), the parameter encoder 641 selects a context variable V1 of the CABAC (Step 902). When the CTU belongs to the inter-prediction slice (Step 901, NO), the parameter encoder 641 selects another context variable V2 (Step 903).

Next, the parameter encoder 641 encodes the bit value of the first bin using a selected context variable (Step 904). Then, according to the bit value, the parameter encoder 641 updates the value of the context variable used to encode the bit value.

When the bit value of the first bin of the bit string of FIG. 2 is a logic "1", the edge offset filtering direction is a 135-degree or 45-degree diagonal direction. In this case, the 135-degree diagonal direction and the 45-degree diagonal direction are equiprobable, so the bypass coding using a fixed probability, not a coding using a variable probability, is applied when a second bin is encoded.

When the bit value of the first bin is a logic "0", the edge offset filtering direction is a horizontal or vertical direction. In this case, a set of three context values is used to signal an edge offset filtering direction of a CTU that belongs to an intra-prediction slice. Further, another set of three context values is used to signal an edge offset filtering direction of a CTU that belongs to an inter-prediction slice.

In this case, the parameter encoder 641 selects one of the three context variables included in each set according to an indicator related to the difference between the area of at least one vertically long rectangular block included in a CTU and the area of at least one horizontally long rectangular block included in the CTU.

Figure 10:
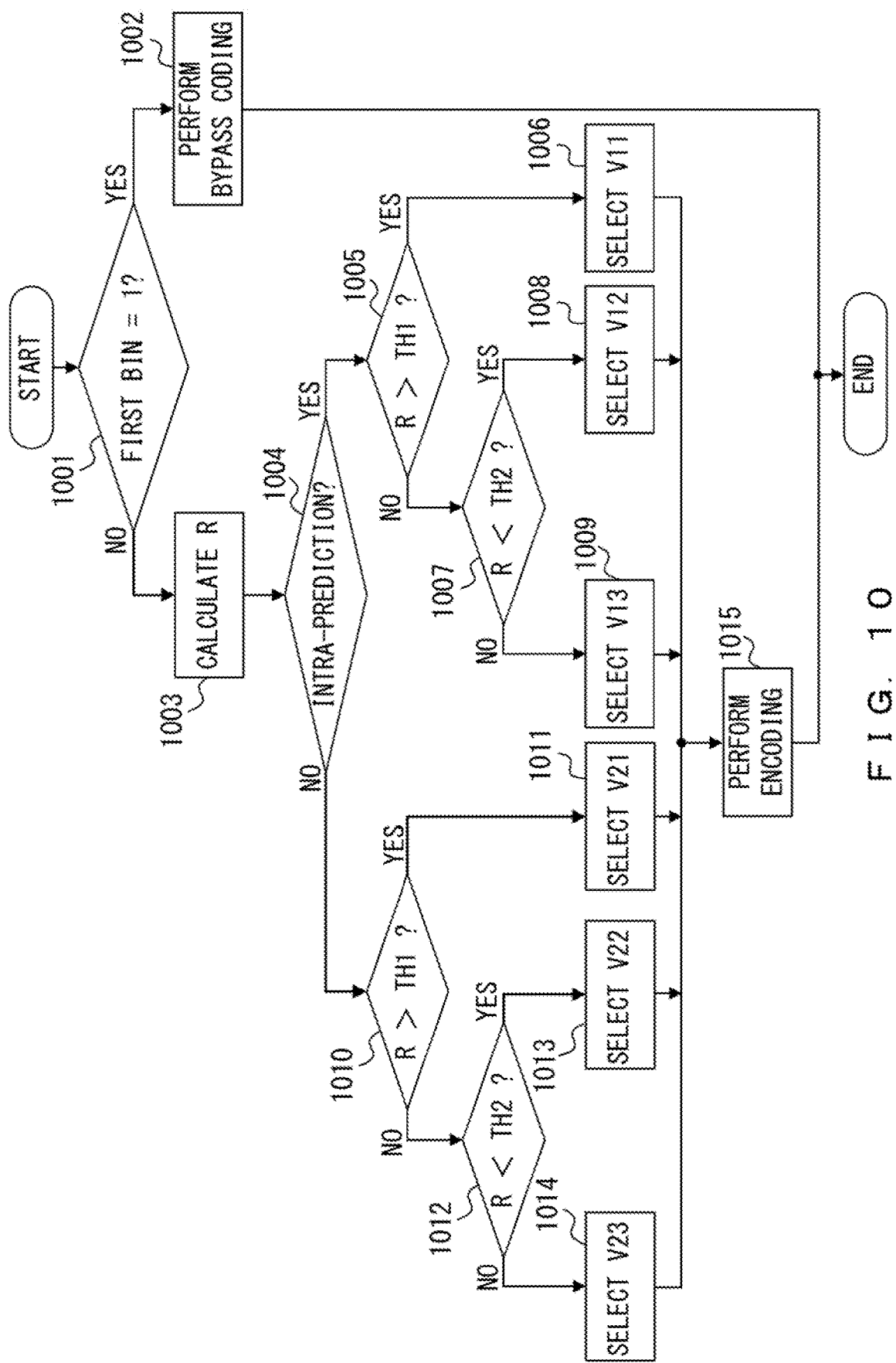
FIG. 10 is a flowchart that illustrates a first specific example of second-bin encoding processing.

FIG. 10 is a flowchart that illustrates a first specific example of second-bin encoding processing in Step 802 of FIG. 8. In the first specific example, when the bit value of the first bin is a logic "0", the bit value of the second bin is encoded using one of the six context variables.

First, the parameter encoder 641 checks whether the bit value of the first bin is a logic "1" (Step 1001). When the bit value of the first bin is the logic "1" (Step 1001, YES), the parameter encoder 641 encodes the bit value of the second bin by the bypass coding (Step 1002).

When the bit value of the first bin is the logic "0" (Step 1001, NO), the parameter encoder 641 calculates an indicator R (Step 1003). The indicator R is an indicator related to the difference between the area of at least one vertically long rectangular block included in the CTU that includes the encoding target block and the area of at least one horizontally long rectangular block included in the CTU.

Next, according to the type of slice output by the control circuit 621, the parameter encoder 641 determines whether the CTU that includes the encoding target block belongs to an intra-prediction slice or an inter-prediction slice (Step 1004).

When the CTU belongs to the intra-prediction slice (Step 1004, YES), the parameter encoder 641 compares the indicator R with a threshold TH1 (Step 1005). When R is greater than TH1 (Step 1005, YES), the parameter encoder 641 selects a context variable V11 of the CABAC (Step 1006).

When R is equal to or less than TH1 (Step 1005, NO), the parameter encoder 641 compares R with a threshold TH2 (Step 1007). TH2 is set to a value smaller than TH1. When R is less than TH2, (Step 1007, YES), the parameter encoder 641 selects another context variable V12 (Step 1008).

When R is equal to or greater than TH2 (Step 1007, NO), the parameter encoder 641 selects yet another context variable V13 (Step 1009).

When the CTU belongs to the inter-prediction slice (Step 1004, NO), the parameter encoder 641 compares R with TH1 (Step 1010). When R is greater than TH1 (Step 1010, YES), the parameter encoder 641 selects a context variable V21 of the CABAC (Step 1011).

When R is equal to or less than TH1 (Step 1010, NO), the parameter encoder 641 compares R with TH2 (Step 1012). When R is less than TH2 (Step 1012, YES), the parameter encoder 641 selects another context variable V22 (Step 1013).

When R is equal to or greater than TH2 (Step 1012, NO), the parameter encoder 641 selects yet another context variable V23 (Step 1014).

Next, the parameter encoder 641 encodes the bit value of the second bin using a selected context variable (Step 1015). Then, according to the bit value, the parameter encoder 641 updates the value of the context variable used to encode the bit value.

Figure 11:
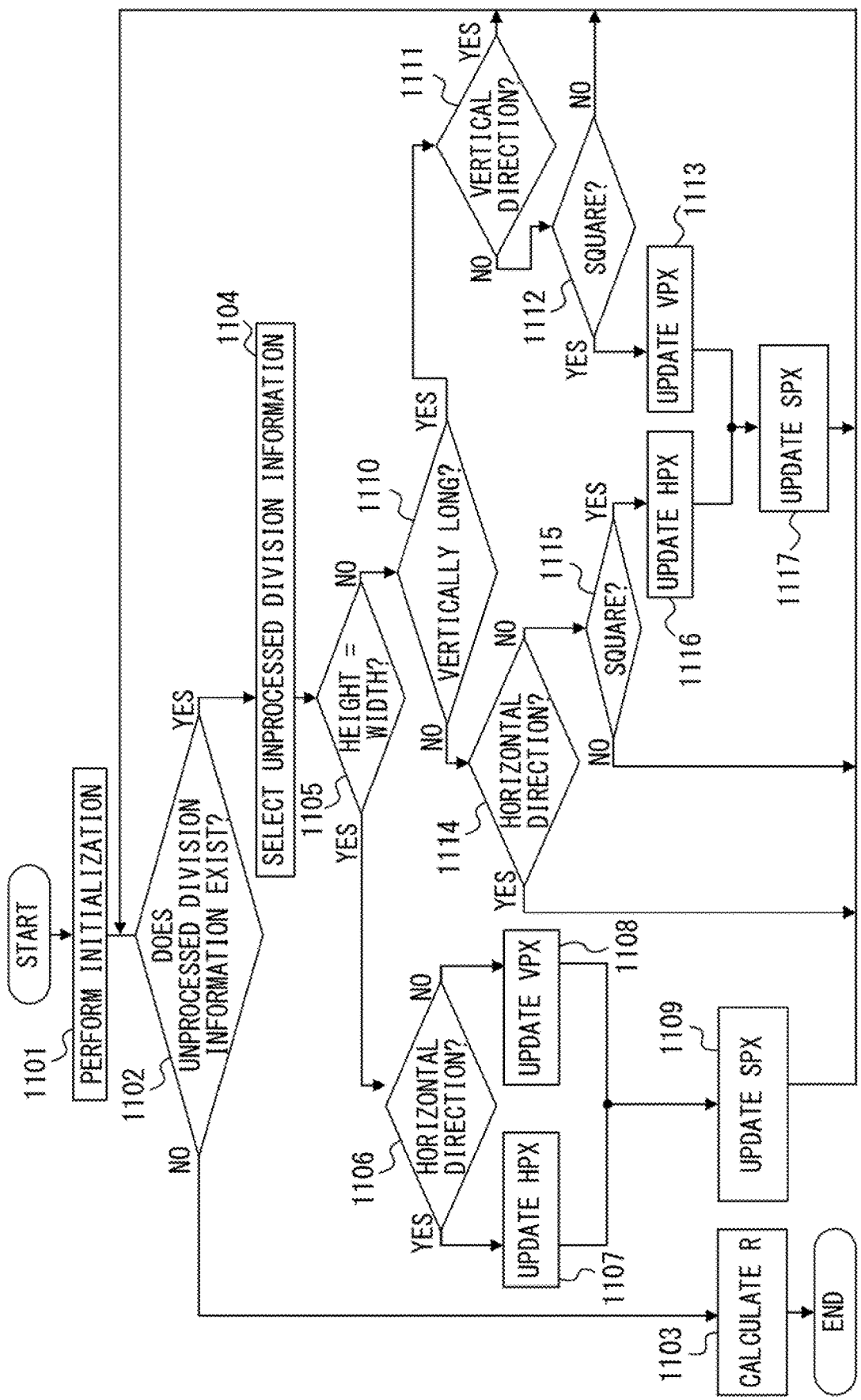
FIG. 11 is a flowchart of indicator calculation processing.

FIG. 11 is a flowchart that illustrates an example of processing of calculating an indicator in Step 1003 of FIG. 10. In this indicator calculation processing, indicators HPX, VPX, and SPX are used as variables that represent the number of pixels. HPX represents the number of pixels belonging to at least one horizontally long rectangular block in the CTU that includes the encoding target block, and VPX represents the number of pixels belonging to at least one vertically long rectangular block in the CTU. SPX represents the number of pixels belonging to at least one square block in the CTU.

First, the parameter encoder 641 initializes HPX, VPX, and SPX (Step 1101). As a result, the values of HPX and VPX are set to 0, and the value of SPX is set to TPX. TPX represents a total number of pixels belonging to the CTU that includes the encoding target block.

Next, the parameter encoder 641 refers to information on a block division of a CTU, and checks whether there exists unprocessed division information (Step 1102). When there exists the unprocessed division information (Step 1102, YES), the parameter encoder 641 selects an unprocessed piece of division information (Step 1104). The division information includes information that indicates the width and the height of a block before division is performed and information that indicates the width and the height of each of a plurality of blocks obtained by the division.

Next, the parameter encoder 641 compares the height of a block before division with the width of the block, the height and the width being indicated by the selected piece of division information (Step 1105). When the height of the block before division is equal in length to the width of the block (Step 1105, YES), the parameter encoder 641 checks the direction of a division line indicated by the selected piece of division information (Step 1106).

When the direction of the division line is a horizontal direction (Step 1106, YES), the parameter encoder 641 adds, to HPX, the number of pixels belonging to the block before the division, so as to update HPX (Step 1107). When the direction of the division line is a vertical direction (Step 1106, NO), the parameter encoder 641 adds, to VPX, the number of pixels belonging to the block before the division, so as to update VPX (Step 1108).

Next, the parameter encoder 641 subtracts, from SPX, the number of pixels belonging to the block before the division, so as to update SPX (Step 1109), and the parameter encoder 641 repeats the processes of and after Step 1102.

When the height of the block before the division is not equal in length to the width of the block (Step 1105, NO), the parameter encoder 641 checks the shape of the block (Step 1110). When the height of the block before the division is greater in length than the width of the block, it is determined that the block has a vertically long rectangular shape, and when the width is greater in length than the height, it is determined that the block has a horizontally long rectangular shape.

When the block before the division has a vertically long rectangular shape (Step 1110, YES), the parameter encoder 641 checks the direction of a division line indicated by the piece of division information (Step 1111). When the direction of the division line is a vertical direction (Step 1111, YES), the parameter encoder 641 repeats the processes of and after Step 1102.

When the direction of the division line is a horizontal direction (Step 1111, NO), the parameter encoder 641 checks the shape of two blocks obtained by the division (Step 1112). When the height of a block obtained by the division is equal in length to the width of the block, it is determined that the block has a square shape.

When neither of the two blocks obtained by the division has a square shape (Step 1112, NO), the parameter encoder 641 repeats the processes of and after Step 1102. When one of the two blocks obtained by the division has a square shape (Step 1112, YES), the parameter encoder 641 subtracts, from VPX, the number of pixels belonging to the square block obtained by the division, so as to update VPX (Step 1113).

Next, the parameter encoder 641 adds, to SPX, the number of pixels belonging to the square block obtained by the division so as to update SPX (Step 1117), and the parameter encoder 641 repeats the processes of and after Step 1102.

When the block before the division has a horizontally long rectangular shape (Step 1110, NO), the parameter encoder 641 checks the direction of a division line indicated by the piece of division information (Step 1114). When the direction of the division line is a horizontal direction (Step 1114, YES), the parameter encoder 641 repeats the processes of and after Step 1102.

When the direction of the division line is a vertical direction (Step 1114, NO), the parameter encoder 641 checks the shape of two blocks obtained by the division (Step 1115). When neither of the two blocks obtained by the division has a square shape (Step 1115, NO), the parameter encoder 641 repeats the processes of and after Step 1102.

When one of the two blocks obtained by the division has a square shape (Step 1115, YES), the parameter encoder 641 subtracts, from HPX, the number of pixels belonging to the square block obtained by the division, so as to update HPX (Step 1116). Then, the parameter encoder 641 performs the processes of and after Step 1117.

When the parameter encoder 641 has processed all of the pieces of division information (Step 1102, NO), the parameter encoder 641 calculates the indicator R using the following formula (Step 1103).

$$R=(HPX-VPX)/TPX \qquad (1)$$

The encoding processing of FIG. 9 and the encoding processing of FIG. 10 make it possible to apply different probability models to a parameter for a CTU that belongs to an intra-prediction slice and to a parameter for a CTU that belongs to an inter-prediction slice. This results in being able to reflect, in a produced code amount, a probabilistic difference between an edge offset filtering direction when a rectangular block is intra-prediction encoded and an edge offset filtering direction when the rectangular block is inter-prediction encoded.

The value of a context variable used to describe a variable probability is initialized and updated, for example, following the patterns as defined in the HEVC standard. The initial value may be optimized by learning which value is reached by the context variable after long encodings.

For example, the initial value of an MPS described by a context variable that is used for an intra-prediction slice is set to a bit value that is different from the bit value of the initial value of an MPS described by a context variable that is used for an inter-prediction slice.

In the encoding processing of FIG. 10, when the bit value of a first bin is a logic "0", it is possible to use a different probability model according to the value of the indicator R regardless of whether a CTU belongs to an intra-prediction slice or an inter-prediction slice. This results in being able to reflect, in a produced code amount, a difference between the area of a vertically long block in a CTU and the area of a horizontally long block in the CTU.

FIG. 12 is a flowchart that illustrates a second specific example of the second-bin encoding processing in Step 802 of FIG. 8. In the second specific example, when the bit value of the first bin is a logic "0" and the indicator R satisfies a prescribed condition, the bit value of the second bin is encoded by the bypass coding.

The processes of Step 1201 to Step 1204 and Step 1215 of FIG. 12 are similar to the processes of Step 1001 to Step 1004 and Step 1015 of FIG. 10.

When the CTU belongs to the intra-prediction slice (Step 1204, YES), the parameter encoder 641 compares the indicator R with the threshold TH1 (Step 1205). When R is greater than TH1 (Step 1205, YES), the parameter encoder 641 selects a context variable V31 of the CABAC (Step 1207).

When R is equal to or less than TH1 (Step 1205, NO), the parameter encoder 641 compares R with the threshold TH2 (Step 1206). When R is less than TH2, (Step 1206, YES), the parameter encoder 641 selects another context variable V32 (Step 1208).

When R is equal to or greater than TH2 (Step 1206, NO), the parameter encoder 641 encodes the bit value of the second bin by the bypass coding (Step 1209).

When the CTU belongs to the inter-prediction slice (Step 1204, NO), the parameter encoder 641 compares R with TH1 (Step 1210). When R is greater than TH1 (Step 1210, YES), the parameter encoder 641 selects another context variable V33 (Step 1211).

When R is equal to or less than TH1 (Step 1210, NO), the parameter encoder 641 compares R with TH2 (Step 1212). When R is less than TH2 (Step 1212, YES), the parameter encoder 641 selects another context variable V34 (Step 1213).

When R is equal to or greater than TH2 (Step 1212, NO), the parameter encoder 641 encodes the bit value of the second bin by the bypass coding (Step 1214).

The encoding processing of FIG. 12 makes it possible to make encoding processing simpler than the encoding processing of FIG. 10, and to reduce a memory region for storing context variables because fewer context variables are needed.

Figure 13B:
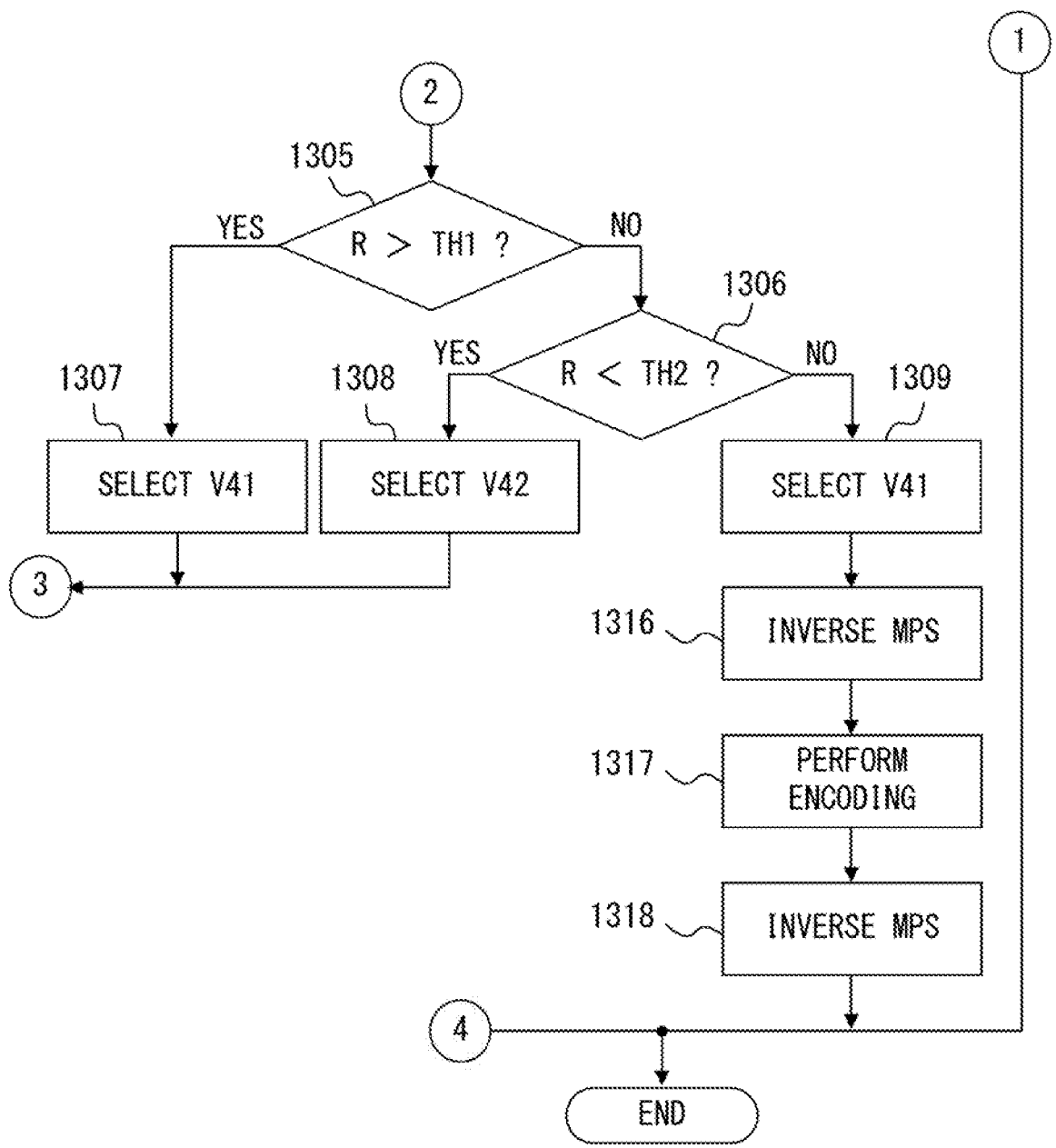
FIG. 13B is part 2 of the flowchart that illustrates the third specific example of the second-bin encoding processing.

FIGS. 13A and 13B are a flowchart that illustrates a third specific example of the second-bin encoding processing in Step 802 of FIG. 8. In the third specific example, when the bit value of the first bin is a logic "0", the bit value of the second bin is encoded using one of four context variables.

The processes of Step 1301 to Step 1304 and Step 1315 of FIG. 13A are similar to the processes of Step 1001 to Step 1004 and Step 1015 of FIG. 10.

When the CTU belongs to the intra-prediction slice (Step 1304, YES), the parameter encoder 641 compares the indicator R with the threshold TH1 (Step 1305). When R is greater than TH1 (Step 1305, YES), the parameter encoder 641 selects a context variable V41 of the CABAC (Step 1307).

When R is equal to or less than TH1 (Step 1305, NO), the parameter encoder 641 compares R with the threshold TH2 (Step 1306). In this case, TH2 is calculated using the following formula by use of TH1.

$$TH2 = 1 - TH1 \quad (2)$$

When R is less than TH2, (Step 1306, YES), the parameter encoder 641 selects another context variable V42 (Step 1308).

When R is equal to or greater than TH2 (Step 1306, NO), the parameter encoder 641 selects the context variable V41 (Step 1309), and inverses the value of an MPS described by the context variable V41 (Step 1316). For example, when the MPS is a logic "1", the value is changed to a logic "0", and when the MPS is the logic "0", the value is changed to the logic "1".

Next, the parameter encoder 641 encodes the bit value of the second bin using the context variable V41 that describes the inversed MPS, and updates the value of the context variable V41 according to the bit value of the second bin (Step 1317). Then, the parameter encoder 641 inverses the value of the MPS described by the context variable V41 again (Step 1318).

When the CTU belongs to the inter-prediction slice (Step 1304, NO), the parameter encoder 641 compares R with TH1 (Step 1310). When R is greater than TH1 (Step 1310, YES), the parameter encoder 641 selects another context variable V43 (Step 1311).

When R is equal to or less than TH1 (Step 1310, NO), the parameter encoder 641 compares R with TH2 (Step 1312). When R is less than TH2 (Step 1312, YES), the parameter encoder 641 selects another context variable V44 (Step 1313).

When R is equal to or greater than TH2 (Step 1312, NO), the parameter encoder 641 selects the context variable V43 (Step 1314), and inverses the value of an MPS described by the context variable V43 (Step 1319).

Next, the parameter encoder 641 encodes the bit value of the second bin using the context variable V43 that describes the inversed MPS, and updates the value of the context variable V43 according to the bit value of the second bin (Step 1320). Then, the parameter encoder 641 inverses the value of the MPS described by the context variable V43 again (Step 1321).

The encoding processing of FIGS. 13A and 13B makes it possible to use a single context variable for the values of R in different ranges. This results in being able to perform encoding processing equivalent to the encoding processing of FIG. 10, using context variables fewer than those used in FIG. 10, and in reducing a memory region for storing context variables.

Figure 14:
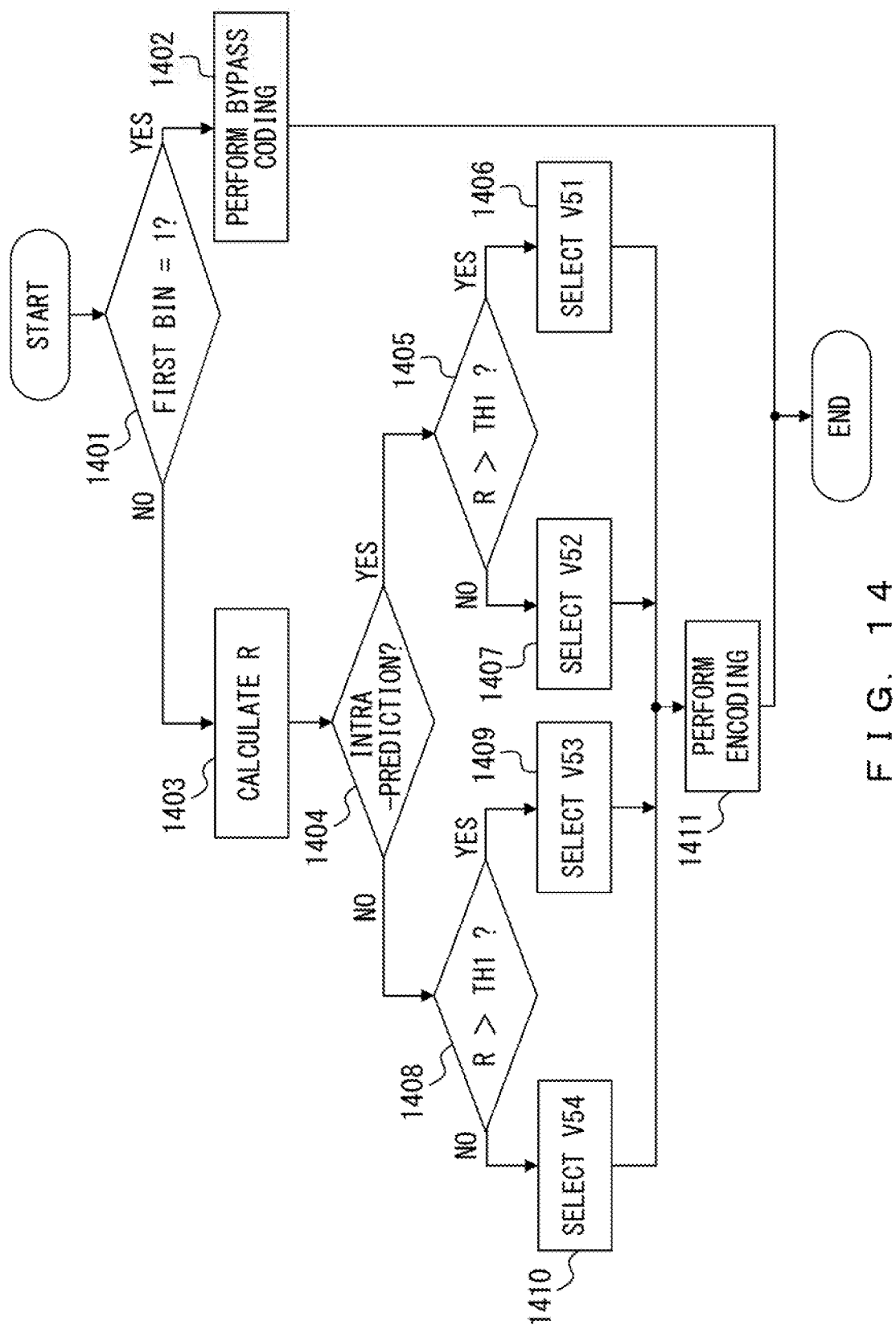
FIG. 14 is a flowchart that illustrates a fourth specific example of the second-bin encoding processing.

FIG. 14 is a flowchart that illustrates a fourth specific example of the second-bin encoding processing in Step 802 of FIG. 8. In the fourth specific example, when the bit value of the first bin is a logic "0", the bit value of the second bin is encoded using one of four context variables.

The processes of Step 1401 to Step 1404 and Step 1411 of FIG. 14 are similar to the processes of Step 1001 to Step 1004 and Step 1015 of FIG. 10.

When the CTU belongs to the intra-prediction slice (Step 1404, YES), the parameter encoder 641 compares the indicator R with the threshold TH1 (Step 1405). When R is greater than TH1 (Step 1405, YES), the parameter encoder 641 selects a context variable V51 of the CABAC (Step 1406).

When R is equal to or less than TH1 (Step 1405, NO), the parameter encoder 641 selects another context variable V52 (Step 1407).

When the CTU belongs to the inter-prediction slice (Step 1404, NO), the parameter encoder 641 compares R with TH1 (Step 1408). When R is greater than TH1 (Step 1408, YES), the parameter encoder 641 selects another context variable V53 (Step 1409).

When R is equal to or less than TH1 (Step 1408, NO), the parameter encoder 641 selects another context variable V54 (Step 1410).

The encoding processing of FIG. 14 makes it possible to make encoding processing simpler than the encoding processing of FIG. 10, and to reduce a memory region for storing context variables because fewer context variables are needed.

FIG. 15 is a flowchart that illustrates a second specific example of the first-bin encoding processing in Step 801 of FIG. 8. In the second specific example, the bit value of the first bin is encoded by the bypass coding.

The parameter encoder 641 encodes the bit value of the first bin by the bypass coding regardless of whether the CTU that includes the encoding target block belongs to an intra-prediction slice or an inter-prediction slice (Step 1501).

The encoding processing of FIG. 15 makes it possible to make encoding processing simpler than the encoding processing of FIG. 9.

Figure 16:
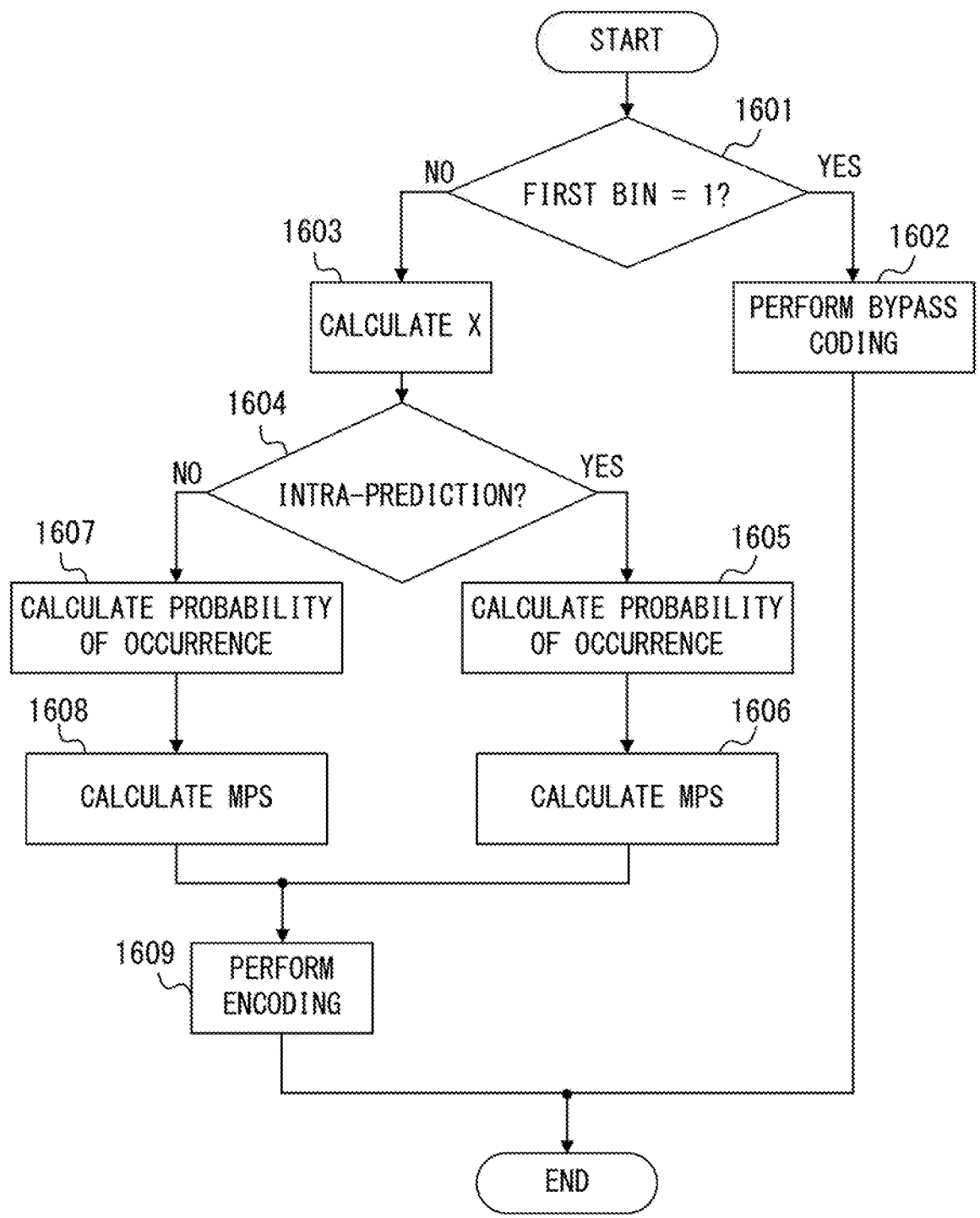
FIG. 16 is a flowchart that illustrates a fifth specific example of the second-bin encoding processing.

FIG. 16 is a flowchart that illustrates a fifth specific example of the second-bin encoding processing in Step 802 of FIG. 8. In the fifth specific example, when the bit value of the first bin is a logic "0", an MPS and a probability of occurrence are calculated using an indicator X instead of a context variable and the bit value of the second bin is encoded using the calculated MPS and probability of occurrence.

The processes of Step 1601 and Step 1602 of FIG. 16 are similar to the processes of Step 1001 and Step 1002 of FIG. 10.

When the bit value of the first bin is a logic "0" (Step 1601, NO), the parameter encoder 641 calculates the indicator X using the following formulas by use of the height and the width of each block in the CTU that includes the encoding target block (Step 1603).

$$X = \mathrm{SUM}(RHWBi * NPXBi) / \mathrm{SUM}(NPXBi) \tag{3}$$

$$RHWBi = Hi/Wi \tag{4}$$

$$NPXBi = Hi * Wi \tag{5}$$

Hi and Wi in Formulas (4) and (5) respectively represent the height and the width of an i-th block in the CTU. RHWBi in Formula (4) represents the ratio of the height of the i-th block to the width of the block, and NPXBi in Formula (5) represents the number of pixels included in the i-th block. SUM( ) in Formula (3) represents a sum with respect to all of the blocks in the CTU, and SUM(NPXBi) represents the total number of pixels included in the CTU.

RHWBi=1 when all of the blocks in the CTU have a square shape, so X=1. RHWBi>1 when all of the blocks in the CTU have a vertically long rectangular shape, so X>1. RHWBi<1 when all of the blocks in the CTU have a horizontally long rectangular shape, so X<1.

Thus, X in Formula (3) is an indicator that indicates a level of the probability that blocks included in the CTU that includes the encoding target block have a vertically long rectangular shape. More vertically long rectangular blocks are included in the CTU if the value of X is larger, and more horizontally long rectangular blocks are included in the CTU if the value of X is smaller.

Next, according to the type of slice output by the control circuit 621, the parameter encoder 641 determines whether the CTU that includes the encoding target block belongs to an intra-prediction slice or an inter-prediction slice (Step 1604).

When the CTU belongs to the intra-prediction slice (Step 1604, YES), the parameter encoder 641 calculates the probability of occurrence P of an MPS using the following formulas (Step 1605).

$$P = \mathrm{Max}P * Y \tag{6}$$

$$Y = (X<1?(X*\mathrm{Min}W/\mathrm{Max}H):(\mathrm{Min}H/\mathrm{Max}W/X)) \tag{7}$$

MaxP in Formula (6) is a constant that is determined in advance, and corresponds to a maximum probability on the right side of Formula (6). Formula (7) has a conditional operation on its right side, where $Y = X*\mathrm{Min}W/\mathrm{Max}H$ when $X<1$ and $Y = \mathrm{Min}H/\mathrm{Max}W/X$ when $X \geq 1$.

MaxH represents a maximum value of the height of a block of luma components, and MinH represents a minimum value of the height of the block of luma components. MaxW represents a maximum value of the width of the block of luma components, and MinW represents a minimum value of the width of the block of luma components.

Next, the parameter encoder 641 calculates a bit value S of the MPS using the following formula (Step 1606).

$$S = (X<1?1:0) \tag{8}$$

Formula (8) has a conditional operation on its right side, where S=1 when X<1 and S=0 when X≥1.

When the CTU belongs to the inter-prediction slice (Step 1604, NO), the parameter encoder 641 calculates the probability of occurrence P of the MPS using the following formulas (Step 1607).

$$P = \mathrm{Max}P * Z \tag{9}$$

$$Z = (X>1?(X*\mathrm{Min}W/\mathrm{Max}H):(\mathrm{Min}H/\mathrm{Max}W/X)) \tag{10}$$

Formula (10) has a conditional operation on its right side, where $Z = X*\mathrm{Min}W/\mathrm{Max}H$ when $X>1$ and $Z = \mathrm{Min}H/\mathrm{Max}W/X$ when $X \leq 1$.

Next, the parameter encoder 641 calculates the bit value S of the MPS using the following formula (Step 1608).

$$S = (X>1?1:0) \tag{11}$$

Formula (11) has a conditional operation on its right side, where S=1 when X>1 and S=0 when X≤1.

Next, the parameter encoder 641 encodes the bit value of the second bin using the calculated probability of occurrence P and the calculated bit value S instead of a context variable (Step 1609). In this case, a context variable is not used, so an updating of a context variable is not performed regardless of whether the bit value of the second bin corresponds to the MPS.

The encoding processing of FIG. 16 makes it possible to more accurately reflect, in a produced code amount, a distribution of blocks having various shapes in a CTU.

Next, a second specific example of the video encoding processing is described with reference to FIGS. 17 and 18. In the second specific example of the video encoding processing, a SAO filtering parameter itself is determined according to information on a block division of a CTU, instead of a process of encoding a SAO filtering parameter being changed according to the information on a block division of a CTU. For example, when an encoding target block has a rectangular shape, the SAO filter 629 of FIG. 6 can determine an edge offset filtering direction according to the direction of the long side of the rectangular shape.

Figure 17:
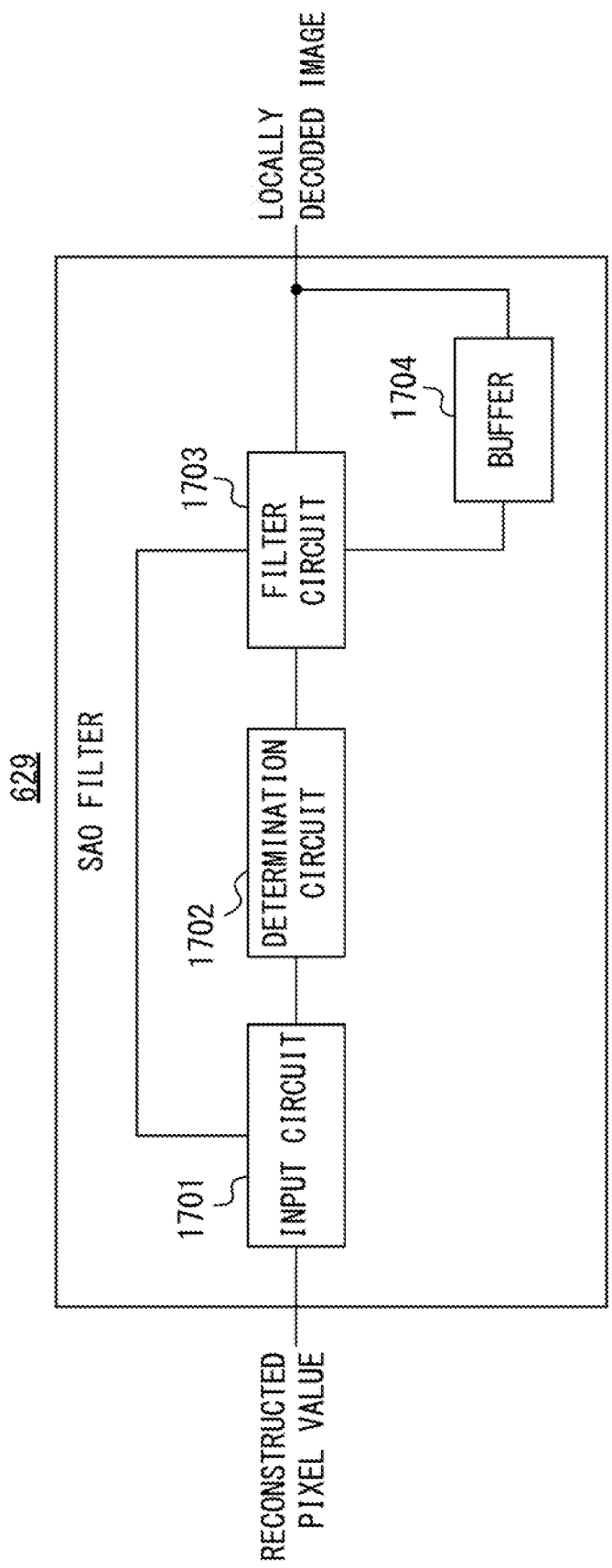
FIG. 17 illustrates a functional configuration of a SAO filter.

FIG. 17 illustrates an example of a functional configuration of the SAO filter 629 described above. The SAO filter 629 of FIG. 17 includes an input circuit 1701, a determination circuit 1702, a filter circuit 1703, and a buffer 1704, and applies edge offset filtering in a different direction for each block in a CTU.

The input circuit 1701 receives a reconstructed pixel value output by the inverse transformer 628 and outputs reconstructed pixel values of a CTU to the determination circuit 1702 every time the input circuit 1701 receives a completion signal from the filter circuit 1703. The determination circuit 1702 selects the band offset mode or the edge offset mode and determines a parameter in the selected operation mode. For example, when the edge offset mode is selected, an edge offset filtering direction and an offset value are determined according the shape of a block.

The filter circuit 1703 performs SAO filtering processing on each pixel included in each CTU using the parameter determined by the determination circuit 1702, and outputs a locally decoded image constituted of filtered reconstructed pixel values to the buffer 1704 and the frame memory 626. Then, the filter circuit 1703 outputs a completion signal to the input circuit 1701 every time SAO filtering processing of a CTU is completed.

The buffer 1704 accumulates a locally decoded image output by the filter circuit 1703, and outputs accumulated locally decoded images to the filter circuit 1703. The locally decoded image output by the buffer 1704 is used in SAO filtering processing of an adjacent CTU.

Figure 18:
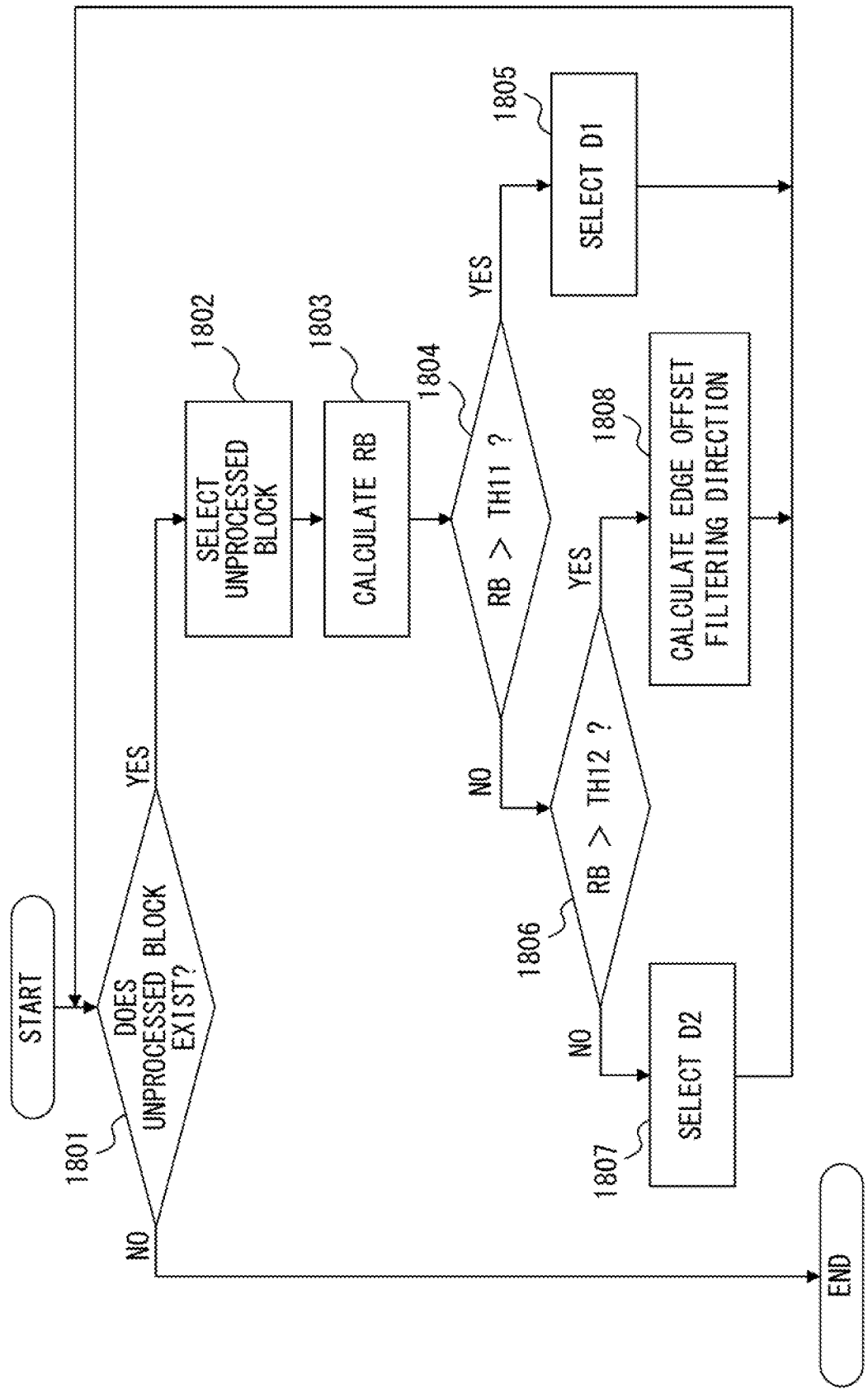
FIG. 18 is a flowchart of parameter determination processing.

FIG. 18 is a flowchart that illustrates an example of parameter determination processing performed by the determination circuit 1702 of FIG. 17. First, the determination circuit 1702 checks whether there exists an unprocessed block in the encoding target CTU (Step 1801). When there exists an unprocessed block (Step 1801, YES), the determination circuit 1702 selects an unprocessed block (Step 1802).

Next, the determination circuit 1702 calculates an indicator RB that indicates a shape of the selected block using the following formula by use of the height H and the width W of the block (Step 1803).

$$RB = C*(W/H) \tag{12}$$

A constant C in Formula (12) is used to convert the value of W/H into an integer. For example, C may be 128. The indicator RB indicates the ratio of the height of a block to the width of the block.

Next, the determination circuit 1702 compares RB with a threshold TH11 (Step 1804). When RB is greater than TH11 (Step 1804, YES), the determination circuit 1702 selects a prescribed direction D1 to be an edge offset filtering direction (Step 1805), and repeats the processes of and after Step 1801. The case in which RB is greater than TH11 corresponds to the case in which a block has a horizontally long rectangular shape.

When RB is equal to or less than TH11 (Step 1804, NO), the determination circuit 1702 compares RB with a threshold TH12 (Step 1806). TH12 is set to a value smaller than TH11. When RB is greater than TH12 (Step 1806, YES), the determination circuit 1702 calculates the edge offset filtering direction in accordance with the HEVC standard (Step 1808) and repeats the processes of and after Step 1801. The case in which RB is equal to or less than TH11 and RB is greater than TH12 corresponds to the case in which a block has a square shape.

In this case, a direction in which a maximum loss occurs due to quantization is calculated, and the calculated direction is determined to be the edge offset filtering direction. The determination circuit 1702 may calculate the direction in which a maximum loss occurs for each CTU.

When RB is equal to or less than TH12 (Step 1806, NO), the determination circuit 1702 selects a prescribed direction D2 to be the edge offset filtering direction (Step 1807), and repeats the processes of and after Step 1801. The case in which RB is equal to or less than TH12 corresponds to the case in which a block has a vertically long rectangular shape.

The direction D1 is a direction determined in advance for a horizontally long rectangular block, and the direction D2 is a direction determined in advance for a vertically long rectangular block. The direction D1 may differ depending on whether a block is intra-prediction coded or inter-prediction coded. Likewise, the direction D2 may differ depending on whether a block is intra-prediction coded or inter-prediction coded.

For example, when a block is intra-prediction coded, D1 and D2 may be set to be a horizontal direction and a vertical direction, respectively. When a block is inter-prediction coded, D1 and D2 may be set to be a vertical direction and a horizontal direction, respectively.

When the edge offset filtering direction is determined to be D1 or D2, the parameter encoder 641 does not encode a parameter that represents the determined direction, and the video encoding apparatus 401 does not transmit the parameter that represents the determined direction to a video decoding apparatus. This results in being able to reduce a code amount for signaling a parameter that represents an edge offset filtering direction.

When the edge offset filtering direction is determined in Step 1808, the parameter encoder 641 encodes a parameter that represents the determined direction, and the video encoding apparatus 401 transmits the parameter that represents the determined direction to the video decoding apparatus.

As in the case of the parameter determination processing of FIG. 18, the video decoding apparatus may calculate an indicator RB that indicates the shape of a decoding target block, and may determine the edge offset filtering direction according to RB. When RB is greater than TH11, the video decoding apparatus selects the direction D1 to be the edge offset filtering direction, and when RB is equal to or less than TH12, the video decoding apparatus selects the direction D2 to be the edge offset filtering direction.

When RB is equal to or less than TH11 and is greater than TH12, the video decoding apparatus selects a direction that is indicated by the parameter received from the video encoding apparatus 401 to be the edge offset filtering direction.

The configurations of the video encoding apparatus 401 of FIGS. 4 and 6 are merely examples, and some of the components may be omitted or modified according to the applications or the requirements of the video encoding apparatus 401. The configuration of the SAO filter 629 of FIG. 17 is merely an example, and some of the components may be omitted or modified according to the applications or the requirements of the video encoding apparatus 401.

The flowcharts illustrated in FIGS. 5, 7 to 16, and 18 are merely examples, and some of the processes may be omitted or modified according to the configuration or the requirements of the video encoding apparatus 401.

The parameters of FIGS. 1 and 2 that represent an edge offset filtering direction are merely examples, and other parameters may be used according to the configuration or the requirements of the video encoding apparatus 401. For example, the parameters may be a bit string of three or more bits. The rectangular sub-blocks of FIG. 3 are merely examples, and the shape of a block differs depending on an encoding target video.

Formulas (1) to (12) are merely examples, and other formulations may be used according to the configuration or the requirements of the video encoding apparatus 401. For example, the indicator R may be calculated using the following formula instead of Formula (1).

$$R = (VPX - HPX)/TPX \tag{13}$$

Further, the indicator RB may be calculated using the following formula instead of Formula (12).

$$RB = C*(H/W) \tag{14}$$

The video encoding apparatus 401 may perform video encoding processing using another block partitioning that uses a rectangular block, instead of the QTBT block partitioning.

The video encoding apparatus 401 of FIGS. 4 and 6 may be implemented as a hardware circuit or may be implemented using an information processing device (a computer) illustrated in FIG. 19.

The information processing device of FIG. 19 includes a central processing unit (CPU) 1901, a memory 1902, an input device 1903, an output device 1904, an auxiliary storage 1905, a medium driving device 1906, and a network connecting device 1907. These components are connected to one another via a bus 1908.

The memory 1902 is, for example, a semiconductor memory such as a read only memory (ROM), a random access memory (RAM), or a flash memory, and stores a program and data used for performing video encoding processing. The memory 1902 can be used as the frame memory 626 of FIG. 6 and the buffer 1704 of FIG. 17.

For example, the CPU 1901 (a processor) operates as the first encoder 411 and the second encoder 412 of FIGS. 4 and 6 by executing the program by use of the memory 1902.

The CPU 1901 also operates as the combiner 611, the control circuit 621, the switch 622, the combiner 623, the intra-prediction circuit 624, and the inter-prediction circuit 625 of FIG. 6 by executing the program by use of the memory 1902. The CPU 1901 also operates as the transformer 627, the inverse transformer 628, the SAO filter 629, the parameter encoder 630, the prediction error encoder 631, the combiner 632, and the parameter encoder 641 by executing the program by use of the memory 1902.

The CPU 1901 also operates as the input circuit 1701, the determination circuit 1702, and the filter circuit 1703 by executing the program by use of the memory 1902.

The input device 1903 is, for example, a keyboard or a pointing device, and is used for inputting instructions or information from a user or an operator. The output device 1904 is, for example, a display, a printer, or a speaker, and is used for outputting inquiries to the user or the operator or for outputting a result of processing.

The auxiliary storage 1905 is, for example, a magnetic disk device, an optical disk device, a magneto-optical disk device, or a tape device. The auxiliary storage 1905 may be a hard disk drive. The information processing device can store the program and the data in the auxiliary storage 1905 so as to load them into the memory 1902 and use them.

The medium driving device 1906 drives a portable recording medium 1909 so as to access the recorded content. The portable recording medium 1909 is, for example, a memory device, a flexible disk, an optical disk, or a magneto-optical disk. The portable recording medium 1909 may be, for example, a compact disk read only memory (CD-ROM), a digital versatile disk (DVD), or a universal serial bus (USB) memory. The user or the operator can store the program and the data in the portable recording medium 1909 so as to load them into the memory 1902 and use them.

As described above, a computer-readable recording medium that stores therein a program and data used for performing processing is a physical (non-transitory) recording medium such as the memory 1902, the auxiliary storage 1905, and the portable recording medium 1909.

The network connecting device 1907 is a communication interface circuit that is connected to a communication network such as a local area network (LAN) or the Internet and makes a data conversion associated with communication. The network connecting device 1907 can transmit a bit stream to a video decoding apparatus. The information processing device can also receive the program and the data from an external device via the network connecting device 1907 so as to load them into the memory 1902 and use them.

The information processing device does not necessarily include all of the components in FIG. 19, and some of the components can be omitted according to the applications or the requirements. For example, when there is no need for an interface with the user or the operator, the input device 1903 and the output device 1904 may be omitted. When the information processing device does not access the portable recording medium 1909, the medium driving device 1906 may be omitted.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A video encoding apparatus comprising:
a first encoder configured to divide an encoding target image included in a video into a plurality of blocks, and to encode each of the plurality of blocks by performing a prediction coding by use of filtering processing; and
a second encoder configured to encode a parameter that represents a direction of a line of pixels in the filtering processing by using context-adaptive binary arithmetic coding, wherein
when an encoding target block that is one of the plurality of blocks has a rectangular shape, the second encoder changes a probability in the context-adaptive binary arithmetic coding for encoding the parameter according to a direction of a long side of the rectangular shape.

2. The video encoding apparatus according to claim 1, wherein the second encoder encodes the parameter by using a variable probability in the context-adaptive binary arithmetic coding.

3. The video encoding apparatus according to claim 2, wherein the second encoder changes a context variable according to whether a prediction method for the encoding target block is an intra-prediction or an inter-prediction, the context variable describing a probability of occurrence of a symbol in the context-adaptive binary arithmetic coding.

4. The video encoding apparatus according to claim 2, wherein when the direction of the line of pixels is parallel to a side of the rectangular shape, the second encoder encodes the parameter by using a context variable that describes a probability of occurrence of a symbol in the context-adaptive binary arithmetic coding.

5. The video encoding apparatus according to claim 4, wherein the second encoder determines an indicator that indicates a difference between an area of at least one certain rectangular block in a prescribed region that includes the encoding target block and an area of at least one another rectangular block in the prescribed region, and selects the context variable from among a plurality of context variables according to the indicator, wherein a side of the certain rectangular block in a first direction is longer than another side of the certain rectangular block in a second direction, and a side of the another rectangular block in the second direction is longer than another side of the another rectangular block in the first direction.

6. The video encoding apparatus according to claim 4, wherein the second encoder determines an indicator that indicates a difference between an area of at least one certain rectangular block in a prescribed region that includes the encoding target block and an area of at least one another rectangular block in the prescribed region, changes, according to the indicator, a value of a most probable symbol indicated by the context variable, encodes the parameter by using a changed context variable, and changes the value of the most probable symbol back to a previous value after the parameter is encoded, wherein a side of the certain rectangular block in a first direction is longer than another side of the certain rectangular block in a second direction, and a side of the another rectangular block in the second direction is longer than another side of the another rectangular block in the first direction.

7. The video encoding apparatus according to claim 2, wherein when the direction of the line of pixels is parallel to a side of the rectangular shape, the second encoder determines an indicator that indicates a level of a probability that a plurality of blocks in a prescribed region that includes the encoding target block have a particular rectangular shape, calculates, according to the indicator, a value of a most probable symbol and a probability of occurrence of the most probable symbol in the context-adaptive binary arithmetic coding, and encodes the parameter by using a calculated value of the most probable symbol and a calculated probability of occurrence of the most probable symbol, wherein a side of the particular rectangular shape in a first direction is longer than another side of the particular rectangular shape in a second direction.

8. A video encoding apparatus comprising:
a first encoder configured to divide an encoding target image included in a video into a plurality of blocks, and to encode each of the plurality of blocks by performing a prediction coding by use of edge offset filtering; and
a second encoder configured to encode a parameter that represents an edge offset filtering direction in the edge offset filtering,
wherein when an encoding target block that is one of the plurality of blocks has a rectangular shape, the first encoder determines the edge offset filtering direction according to a direction of a long side of the rectangular shape, and when the encoding target block does not have a rectangular shape, the second encoder encodes the parameter.

9. A video encoding method comprising:
dividing, by a video encoding apparatus, an encoding target image included in a video into a plurality of blocks;
encoding, by the video encoding apparatus, each of the plurality of blocks by performing a prediction coding by use of filtering processing; and
encoding, by the video encoding apparatus, a parameter that represents a direction of a line of pixels in the filtering processing by using context-adaptive binary arithmetic coding, wherein
the encoding the parameter changes, when an encoding target block that is one of the plurality of blocks has a rectangular shape, a probability in the context-adaptive binary arithmetic coding for encoding the parameter according to a direction of a long side of the rectangular shape.

10. The video encoding method according to claim 9, wherein the encoding the parameter encodes the parameter by using a variable probability in the context-adaptive binary arithmetic coding.

11. A video encoding method comprising:
dividing, by a video encoding apparatus, an encoding target image included in a video into a plurality of blocks;
encoding, by the video encoding apparatus, each of the plurality of blocks by performing a prediction coding by use of edge offset filtering; and
encoding, by the video encoding apparatus, a parameter that represents an edge offset filtering direction in the edge offset filtering, wherein
the encoding each of the plurality of blocks determines, when an encoding target block that is one of the plurality of blocks has a rectangular shape, the edge offset filtering direction according to a direction of a long side of the rectangular shape, and
the encoding the parameter encodes the parameter when the encoding target block does not have a rectangular shape.

12. A non-transitory computer-readable recording medium having stored therein a video encoding program that causes a computer to execute a video encoding process comprising:
dividing an encoding target image included in a video into a plurality of blocks;
encoding each of the plurality of blocks by performing a prediction coding by use of filtering processing; and
encoding a parameter that represents a direction of a line of pixels in the filtering processing by using context-adaptive binary arithmetic coding, wherein
when an encoding target block that is one of the plurality of blocks has a rectangular shape, the encoding the parameter changes a probability in the context-adaptive binary arithmetic coding for encoding the parameter according to a direction of a long side of the rectangular shape.

13. The non-transitory computer-readable recording medium according to claim 12, wherein the encoding the parameter encodes the parameter by using a variable probability in the context-adaptive binary arithmetic coding.

14. A non-transitory computer-readable recording medium having stored therein a video encoding program that causes a computer to execute a video encoding process comprising:
dividing an encoding target image included in a video into a plurality of blocks;
encoding each of the plurality of blocks by performing a prediction coding by use of edge offset filtering; and
encoding a parameter that represents an edge offset filtering direction in the edge offset filtering, wherein
the encoding each of the plurality of blocks determines, when an encoding target block that is one of the plurality of blocks has a rectangular shape, the edge offset filtering direction according to a direction of a long side of the rectangular shape, and
the encoding the parameter encodes the parameter when the encoding target block does not have a rectangular shape.

* * * * *